US012725410B2

(12) United States Patent
Cao et al.

(10) Patent No.: US 12,725,410 B2
(45) Date of Patent: Sep. 1, 2026

(54) VIDEO PROCESSING COLLABORATION METHOD, APPARATUS, DEVICE, AND STORAGE MEDIUM

(71) Applicant: TENCENT TECHNOLOGY (SHENZHEN) COMPANY LIMITED, Shenzhen (CN)

(72) Inventors: Hongbin Cao, Shenzhen (CN); Sijia Chen, Shenzhen (CN); Yongcheng Huang, Shenzhen (CN); Jian Cao, Shenzhen (CN); Xiaoxiang Yang, Shenzhen (CN); Jia Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 333 days.

(21) Appl. No.: 18/525,089

(22) Filed: Nov. 30, 2023

(65) Prior Publication Data

US 2024/0096087 A1 Mar. 21, 2024

Related U.S. Application Data

(63) Continuation of application No. PCT/CN2022/137807, filed on Dec. 9, 2022.

(30) Foreign Application Priority Data

Jan. 27, 2022 (CN) ........................ 202210103031.4

(51) Int. Cl.

*G06V 10/94* (2022.01)
*G06V 10/776* (2022.01)

(Continued)

(52) U.S. Cl.

CPC ............ *G06V 10/95* (2022.01); *G06V 10/776* (2022.01); *G06V 20/40* (2022.01); *H04L 67/10* (2013.01)

(58) Field of Classification Search

None

See application file for complete search history.

(56) References Cited

U.S. PATENT DOCUMENTS

| | | | | |
|---|---|---|---|---|
| 10,891,525 | B1 * | 1/2021 | Olgiati | G06T 7/73 |
| 2013/0243075 | A1 | 9/2013 | Dalela et al. | |
| 2023/0370624 | A1 * | 11/2023 | Meardi | H04N 19/164 |

FOREIGN PATENT DOCUMENTS

| | | | |
|---|---|---|---|
| CN | 102625144 | A | 8/2012 |
| CN | 110393921 | A | 11/2019 |

(Continued)

OTHER PUBLICATIONS

Jedari, Video Caching, Analytics, and Delivery at the Wireless Edge: A Survey and Future Directions, 2021, IEEE vol. 23, pp. 431-470 (Year: 2021).*

(Continued)

*Primary Examiner* — Fadi Haj Said

(74) *Attorney, Agent, or Firm* — Sughrue Mion, PLLC

(57) ABSTRACT

A video processing collaboration method includes transmitting a video processing capability request and a video analysis capability request to a terminal device, receiving video processing capability information and video analysis capability information from the terminal device based on the video processing capability request and the video analysis capability request, determining a video processing collaboration configuration based on the video processing capability information and a video analysis collaboration configuration based on the video analysis capability information, allocating an image processing task to the terminal device, to the cloud server, or to both the terminal device and the cloud (Continued)

server, based on the video processing collaboration configuration, and allocating an image analysis task to the terminal device, to the cloud server, or to both the terminal device and the cloud server, based on the video analysis collaboration configuration.

20 Claims, 8 Drawing Sheets

(51) Int. Cl.
*G06V 20/40* (2022.01)
*H04L 67/10* (2022.01)

(56) References Cited

FOREIGN PATENT DOCUMENTS

| | | | |
|---|---|---|---|
| CN | 111371849 A * | 7/2020 | ............ H04L 67/51 |
| CN | 111698470 A | 9/2020 | |
| CN | 111866058 A | 10/2020 | |
| CN | 113194281 A | 7/2021 | |

OTHER PUBLICATIONS

Office Action issued Jul. 30, 2025 in Chinese Application No. 202210103031.4.
Extended European Search Report issued Jan. 24, 2025 in European Application No. 22923503.1.
Jedari et al: "Video Caching, Analytics, and Delivery at the Wireless Edge: A Survey and Future Directions", IEEE Communications Surveys & Tutorials, vol. 23, No. 1, 2021, pp. 431-471, (41 Pages Total).
International Search Report for PCT/CN2022/137807 dated Feb. 21, 2023 (PCT/ISA/210).
Written Opinion for PCT/CN2022/137807 dated Feb. 21, 2023 (PCT/ISA/237).

* cited by examiner

VIDEO PROCESSING COLLABORATION METHOD, APPARATUS, DEVICE, AND STORAGE MEDIUM

CROSS-REFERENCE TO RELATED APPLICATIONS

This application claims priority to International Patent Application No. PCT/CN2022/137807 filed on Dec. 9, 2022, which is based on and claims priority to Chinese Patent Application No. 202210103031.4, filed with the China National Intellectual Property Administration on Jan. 27, 2022, the contents of each of which being herein incorporated by reference in their entireties.

FIELD

Embodiments of the disclosure relate to the field of image processing technologies, and in particular, to a video processing collaboration method and apparatus, a device, and a storage medium.

BACKGROUND

With the development of cloud processing technologies, cloud games are becoming more and more popular. In this game mode, game running and game processing is migrated to the cloud. Moreover, content analysis and video preprocessing on a game picture may be performed in the cloud.

SUMMARY

According to an aspect of one or more embodiments, there is provided a video processing collaboration method includes transmitting a video processing capability request and a video analysis capability request to a terminal device, receiving video processing capability information and video analysis capability information from the terminal device based on the video processing capability request and the video analysis capability request, determining a video processing collaboration configuration based on the video processing capability information and a video analysis collaboration configuration based on the video analysis capability information, allocating an image processing task to the terminal device, to the cloud server, or to both the terminal device and the cloud server, based on the video processing collaboration configuration, and allocating an image analysis task to the terminal device, to the cloud server, or to both the terminal device and the cloud server, based on the video analysis collaboration configuration.

According to other aspects of one or more embodiments, there is also provided an apparatus and non-transitory computer readable storage medium consistent with the video processing collaboration method.

DETAILED DESCRIPTION

Figure 1:
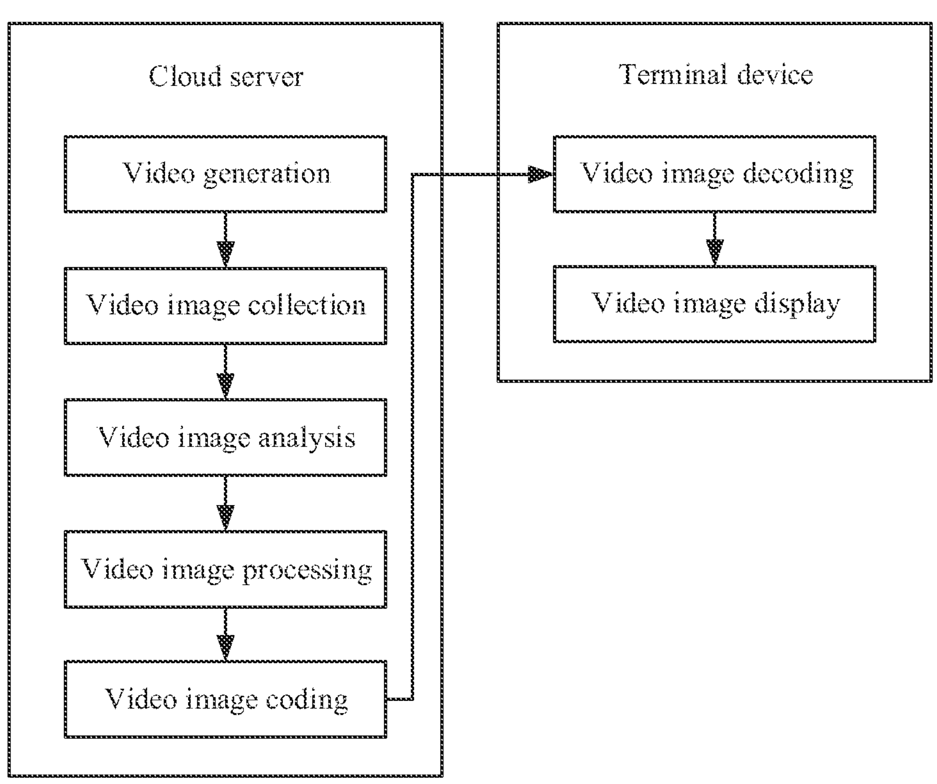
FIG. 1 is a flowchart of an image processing process according to some embodiments.

Certain embodiments are described in detail below with reference to the drawings. The described embodiments are not to be construed as a limitation to the present disclosure.

In the following descriptions, some related embodiments describe a subset of all possible embodiments. However, it may be understood that the some embodiments may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise. It will be understood that "performance requirements", "video analysis capability requirements", "video processing requirements", "frame rate requirements" "resolution requirements" and other "requirements", as described in the disclosure, may also be implemented as "recommendations", "preferences", "expectations, or similar qualifications as will be readily understood by one of ordinary skill in the art.

In the present disclosure, the terms "first", "second", and the like are intended to distinguish between similar objects rather than describe a specific order or sequence. It is to be understood that the terms used in such a way are interchangeable in a proper circumstance, so that various embodiments can be implemented in orders except the order illustrated or described herein. Moreover, the terms "include", "contain" and any other variants mean to cover the non-exclusive inclusion. For example, a process, method, system, product, or cloud server that includes a list of steps or units is not necessarily limited to those steps or units, but may include other steps or units not expressly listed or inherent to such a process, method, product, or device.

With the development of cloud processing technologies, cloud games are becoming more and more popular. A manner of the cloud game is as follows: A cloud server performs logic such as running and processing of the game, codes and compresses a game picture by using a video coding technology, and a coded and compressed video stream is transmitted to a terminal device by using a network, and then the terminal device decodes and plays the video stream.

In this game mode, logic such as game running and game processing that need to be completed by the terminal device is migrated to the cloud server. In addition, to reduce impact of video coding distortion on picture quality of the game picture, the cloud server further performs content analysis and video pre-processing on the game picture before video coding, which undoubtedly further increases computing resource overheads of the cloud server. Therefore, with limited cloud server computing resources, better picture quality of the cloud game cannot be provided According to various embodiments, a video processing collaboration method is provided, including:

- transmitting a video processing capability detection request and a video analysis capability detection request to a terminal device;
- receiving video processing capability information fed back by the terminal device in response to the video processing capability detection request;
- receiving video analysis capability information fed back by the terminal device in response to the video analysis capability detection request;
- determining a target video processing collaboration configuration based on the video processing capability information of the terminal device;
- determining a target video analysis collaboration configuration based on the video analysis capability information of the terminal device;
- wherein the target video processing collaboration configuration allocates at least one image processing task to the terminal device, the cloud server, or both the terminal device and the cloud server; and
- wherein the target video analysis collaboration configuration allocates at least one image analysis task to the terminal device, the cloud server, or both the terminal device and the cloud server.

According to various embodiments, a video processing collaboration method is provided, including: obtaining video processing capability information and video analysis capability information of a terminal device from an operating system of the terminal device; transmitting the video processing capability information and the video analysis capability information of the terminal device to a cloud server, so that the cloud server determines a target video processing collaboration configuration according to the video processing capability information of the terminal device, and determines a target video analysis collaboration configuration according to the video analysis capability information of the terminal device; the target video processing collaboration configuration being a video processing collaboration configuration that allocates at least one image processing task to the terminal device or the cloud server, or a video processing collaboration configuration that allocates the at least one image processing task to the terminal device and the cloud server; and the target video analysis collaboration configuration being a video analysis collaboration configuration that allocates at least one image analysis task to the terminal device or the cloud server, or a video analysis collaboration configuration that allocates the at least one image analysis task to the terminal device and the cloud server; and receiving the target video processing collaboration configuration and the target video analysis collaboration configuration, and transmitting the target video processing collaboration configuration and the target video analysis collaboration configuration to the terminal device.

According to various embodiments, a video processing collaboration method is provided, including: transmitting video processing capability information and video analysis capability information of the terminal device to a client, so that a cloud server corresponding to the client determines a target video processing collaboration configuration according to the video processing capability information of the terminal device, and determines a target video analysis collaboration configuration according to the video analysis capability information of the terminal device; the target video processing collaboration configuration being a video processing collaboration configuration that allocates at least one image processing task to the terminal device or the cloud server, or a video processing collaboration configuration that allocates the at least one image processing task to the terminal device and the cloud server; and the target video analysis collaboration configuration being a video analysis collaboration configuration that allocates at least one image analysis task to the terminal device or the cloud server, or a video analysis collaboration configuration that allocates the at least one image analysis task to the terminal device and the cloud server; and obtaining the target video processing collaboration configuration and the target video analysis collaboration configuration from the client, performing image analysis on a target video according to the target video analysis collaboration configuration, and performing image processing on the target video according to the target video processing collaboration configuration.

According to various embodiments, a video processing collaboration apparatus is provided, including a transmitting module, a receiving module, and a determining module, where the transmitting module is configured to transmit a video processing capability detection request and a video analysis capability detection request to a terminal device; the receiving module is configured to receive video processing capability information fed back by the terminal device in response to the video processing capability detection request, and receive video analysis capability information fed back by the terminal device in response to the video analysis capability detection request; and the determining module is configured to: determine a target video processing collaboration configuration according to the video processing capability information of the terminal device, and determine a target video analysis collaboration configuration according to the video analysis capability information of the terminal device; the target video processing collaboration configuration being a video processing collaboration configuration that allocates at least one image processing task to the terminal device or the cloud server, or a video processing collaboration configuration that allocates the at least one image processing task to the terminal device and the cloud server; and the target video analysis collaboration configuration being a video analysis collaboration configuration that allocates at least one image analysis task to the terminal device or the cloud server, or a video analysis collaboration configuration that allocates the at least one image analysis task to the terminal device and the cloud server.

According to various embodiments, a video processing collaboration apparatus is provided, including a communication module, configured to: obtain video processing capability information and video analysis capability information of a terminal device from an operating system of the terminal device; transmit the video processing capability information and the video analysis capability information of the terminal device to a cloud server, so that the cloud server determines a target video processing collaboration configuration according to the video processing capability information of the terminal device, and determines a target video analysis collaboration configuration according to the video analysis capability information of the terminal device; the target video processing collaboration configuration being a video processing collaboration configuration that allocates at least one image processing task to the terminal device or the cloud server, or a video processing collaboration configuration that allocates the at least one image processing task to the terminal device and the cloud server; and the target video analysis collaboration configuration being a video analysis collaboration configuration that allocates at least one image analysis task to the terminal device or the cloud server, or a video analysis collaboration configuration that allocates the at least one image analysis task to the terminal device and the cloud server; and receive the target video processing collaboration configuration and the target video analysis collaboration configuration, and transmit the target video processing collaboration configuration and the target video analysis collaboration configuration to the terminal device.

According to various embodiments, a video processing collaboration apparatus is provided, including a communication module and a processing module, where the communication module is configured to: transmit video processing capability information and video analysis capability information of the terminal device to a client, so that a cloud server corresponding to the client determines a target video processing collaboration configuration according to the video processing capability information of the terminal device, and determines a target video analysis collaboration configuration according to the video analysis capability information of the terminal device; the target video processing collaboration configuration being a video processing collaboration configuration that allocates at least one image processing task to the terminal device or the cloud server, or a video processing collaboration configuration that allocates the at least one image processing task to the terminal device and the cloud server; and the target video analysis collaboration configuration being a video analysis collaboration configuration that allocates at least one image analysis task to the terminal device or the cloud server, or a video analysis collaboration configuration that allocates the at least one image analysis task to the terminal device and the cloud server; and the processing module is configured to: obtain the target video processing collaboration configuration and the target video analysis collaboration configuration from the client, perform image analysis on a target video according to the target video analysis collaboration configuration, and perform image processing on the target video according to the target video processing collaboration configuration.

According to various embodiments, an electronic device is provided, including a processor and a memory, where the memory is configured to store a computer program, and the processor is configured to invoke and run the computer program stored in the memory to perform the foregoing video processing collaboration method.

According to various embodiments, a client is provided and configured to perform the foregoing video processing collaboration method.

According to various embodiments, a computer readable storage medium is provided, configured to store a computer program, and the computer program enables a computer to perform any foregoing video processing collaboration method.

According to various embodiments, a computer program product is provided, including computer program instructions, and the computer program instructions enable a computer to perform any foregoing video processing collaboration method.

According to various embodiments, a computer program is provided, and the computer program enables a computer to perform any foregoing video processing collaboration method.

An image analysis task is: performing spatial analysis, performing temporal analysis, or performing analysis on a video image with reference to a spatial domain and a time domain to determine whether video scene switching occurs, or determine a region location of a specific object. Performing spatial analysis on a video image refers to performing intra-frame image analysis on the video image, and performing temporal analysis on a video image refers to performing inter-frame image analysis on the video image.

An image processing task: is a task of modifying a pixel value of a frame of video image, where the frame of video image is, for example, a full picture of a video image or a specific region in a video image. The image processing task is, for example, one or more of an image sharpening processing task, an image noise reduction processing task, or an image blur processing task. The image processing task may implement a specific image enhancement effect, or may implement an image blur effect, for example, the image sharpening processing task and the image noise reduction processing task may implement a specific image enhancement effect, and the image blur processing task may implement an image blur effect. In this application, the image processing task may be specifically an image rendering task.

In some embodiments, the image processing task is performed based on a result of an image analysis task. For example, after analyzing a video image of a video source, a cloud server determines that video scene switching occurs, and the cloud server may perform blur processing on a background of the switched video image. For another example, after analyzing a video image of a video source, the cloud server determines a region location of a specific object in the video image, and the cloud server may perform noise reduction processing and sharpening processing on the region location.

In some embodiments, an objective of the image analysis task is to perform subsequent image coding. In some embodiments, an objective of the image analysis task may be to perform an image processing task and image coding. In conclusion, in this application, there may be an association relationship between the image analysis task and the image processing task, or there may be no association relationship. This is not limited in this application.

The following describes a technical problem that may be addressed by some embodiments of the disclosure:

Currently, a relatively complex video or image processing process in some cloud-based scenes may be as follows: As shown in FIG. 1, in some embodiments, a cloud server generates a video, collects a video image, analyzes a captured video image, processes a video image according to an analysis result, and codes a processed video image to obtain a code stream of the video image. Further, the cloud server may transmit the code stream to a terminal device. The terminal device decodes the code stream, and finally displays the video image according to a decoding result.

Figure 2:
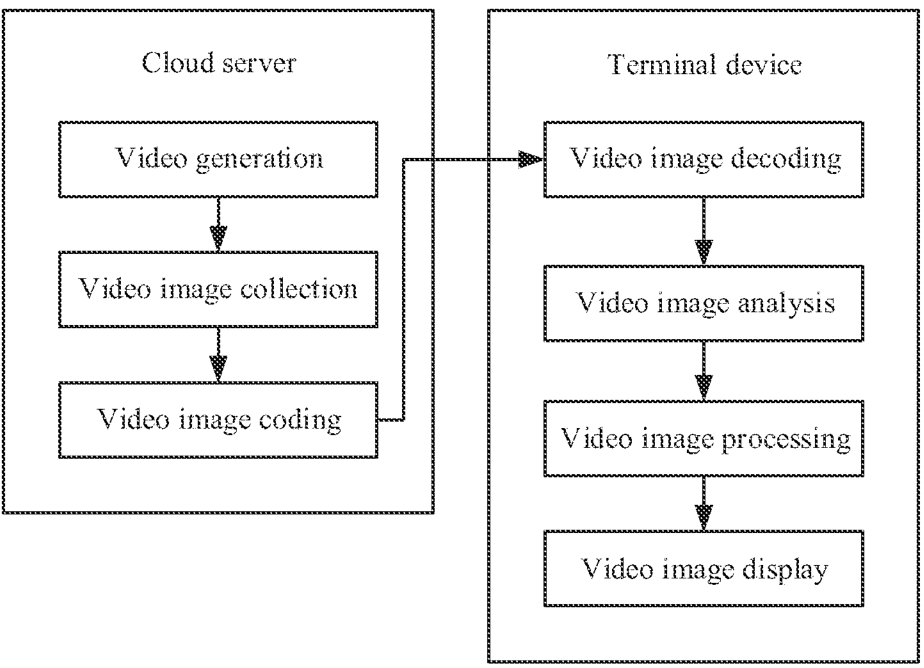
FIG. 2 is a flowchart of another image processing process according to some embodiments.

In some embodiments, as shown in FIG. 2, the cloud server generates a video, collects a video image, and codes the collected video image to obtain a code stream of the video image. Further, the cloud server may transmit the code stream to the terminal device. The terminal device decodes the code stream, performs image analysis on the decoded video image, performs image processing on the video image according to an analysis result, such as sharpening processing, blur processing, and noise reduction processing, and finally displays the processed video image.

It may be learned from this that there is a coupling between a video analysis process and a video processing process, that is, at present, both the video analysis process and the video processing process are independently completed by the cloud server or the terminal device.

However, with limited cloud server computing resources, a current image processing manner cannot provide a user with better cloud game picture quality experience.

To resolve the foregoing technical problem, in this application, the cloud server may determine a target video processing collaboration configuration according to a video processing capability of the terminal device. For example, the cloud server may allocate at least one image processing task to the cloud server or the terminal device, or collaboratively allocate at least one image processing task to the cloud server and the terminal device. In addition, the cloud server may determine a target video analysis collaboration configuration according to video analysis capability information of the terminal device. For example, the cloud server may allocate at least one image analysis task to the cloud server or the terminal device, or collaboratively allocate at least one image analysis task to the cloud server and the terminal device. With limited cloud server computing resources, an idle computing resource of the terminal device can be fully used, so that better cloud game quality experience can be provided for the user.

A capability of the terminal device referred to in this application, such as a video processing capability and a video analysis capability, refers to a software and hardware condition for executing a corresponding task by the terminal device. For example, the video processing capability of the terminal device refers to a software and hardware condition for processing an image processing task of the video by the terminal device. The software and hardware condition limits parameters such as a video resolution, a video frame rate, an available processing algorithm, or duration for video processing. The video analysis capability refers to a software and hardware condition for processing an image analysis task of the video by the terminal device, and the software and hardware condition limits parameters such as a quantity of image frames during each time of analysis, a video size that can be supported, a video image mode, an available video analysis algorithm, or duration for video analysis.

It is to be understood that the technical solutions of this application may be applied to a real-time communications (RTC) scene, but are not limited thereto. Typical RTC technologies are video conferencing, a video call, telecommuting, telemedicine, interactive livestreaming, and cloud games.

Figures 3, 4A:
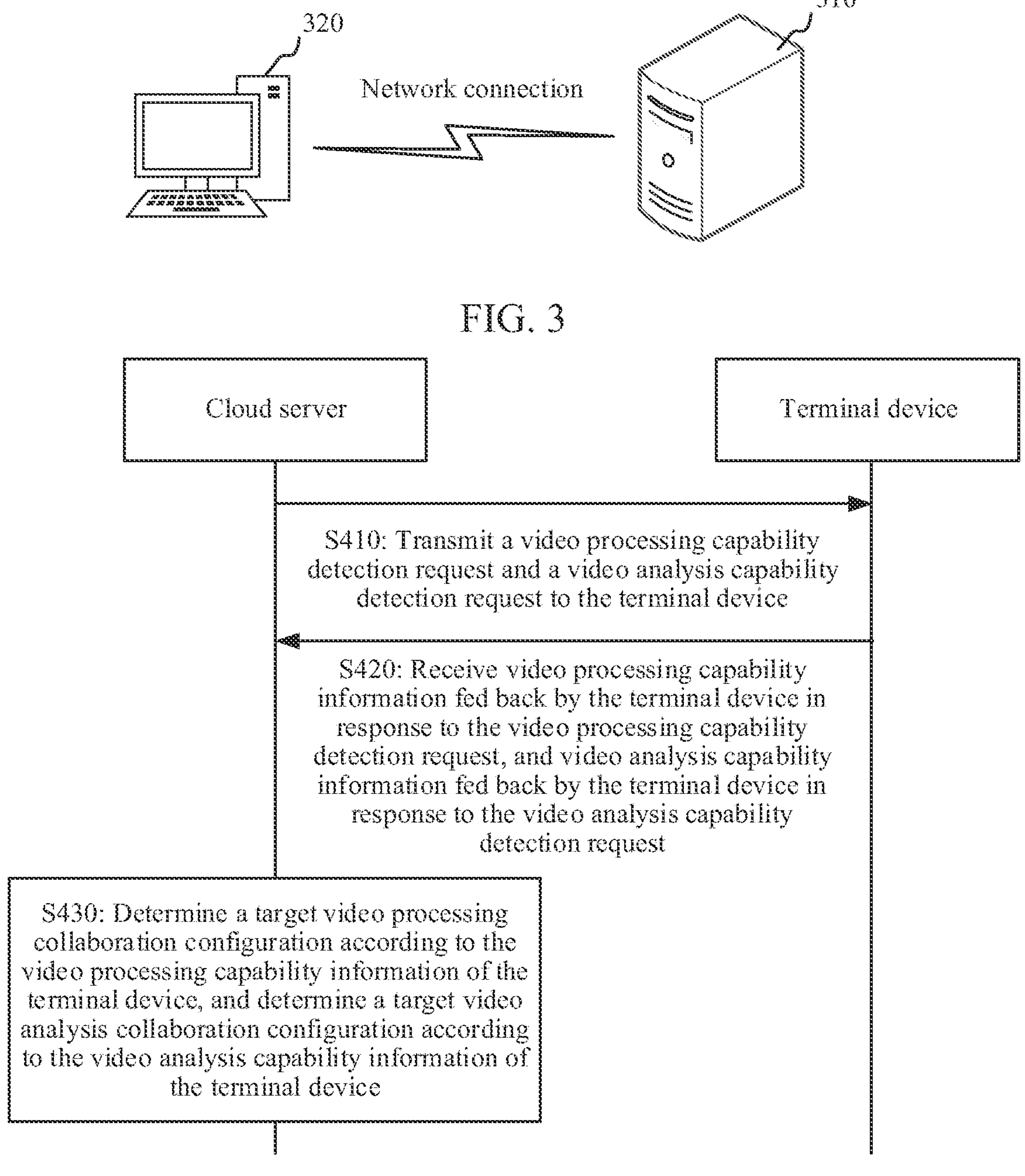
FIG. 3 is a schematic diagram of a cloud game scene according to some embodiments.
FIG. 4A is a flowchart of a video processing collaboration method according to some embodiments.

For example, FIG. 3 is a schematic diagram of a cloud game scene according to some embodiments. As shown in FIG. 3, a cloud server 310 may communicate with a player game terminal 320. The cloud server 310 may run a game, collect a video image, code a captured video image, and obtain a code stream of the video image. Further, the cloud server may transmit the code stream to a terminal device, and the terminal device decodes the code stream, and finally displays the video image according to a decoding result.

In some embodiments, communication between the cloud server 310 and the player game terminal 320 may be implemented by using Long Term Evolution (LTE), a New Radio (NR) technology, a Wireless Fidelity (Wi-Fi) technology, or the like, but is not limited thereto.

In a cloud game scene, the cloud server is a server that runs a game on the cloud, and has functions such as video enhancement (coding pre-processing) and video coding, but is not limited thereto.

The terminal device is a device that has rich human-computer interaction manners, has an Internet access capability, usually carries various operating systems, and has a relatively strong processing capability. The terminal device may be a smartphone, a living room television, a tablet computer, an in-vehicle terminal, a player game terminal, such as a palm game console, but is not limited thereto.

The following describes the technical solutions of this application in detail:

FIG. 4A is a flowchart of a video processing collaboration method according to some embodiments. The method may be performed by a cloud server and a terminal device. For example, in a cloud game scene, the cloud server may be the cloud server 310 in FIG. 3, and the terminal device may be the player game terminal 320 in FIG. 3. This application sets no limitation on an execution body of the video processing collaboration determining method. As shown in FIG. 4A, the method includes the following steps:

S410: The cloud server transmits a video processing capability detection request and a video analysis capability detection request to the terminal device.

S420: The cloud server receives video processing capability information fed back by the terminal device in response to the video rendering processing capability detection request, and receives video analysis capability information fed back by the terminal device in response to the video analysis capability detection request.

S430: The cloud server determines a target video processing collaboration configuration according to the video processing capability information of the terminal device, and determines a target video analysis collaboration configuration according to the video analysis capability information of the terminal device.

The target video processing collaboration configuration is used for determining to allocate at least one image processing task to at least one of the terminal device or the cloud server; and the target video analysis collaboration configuration is used for determining to allocate at least one image analysis task to the terminal device or the cloud server.

In some embodiments, the target video processing collaboration configuration is a video processing collaboration configuration that allocates the at least one image processing task to the terminal device or the cloud server, or a video processing collaboration configuration that allocates the at least one image processing task to the terminal device and the cloud server.

In some embodiments, the target video analysis collaboration configuration is a video analysis collaboration configuration that allocates the at least one image analysis task to the terminal device or the cloud server, or a video analysis collaboration configuration that allocates the at least one image analysis task to the terminal device and the cloud server.

The cloud server may transmit the video processing capability detection request and the video analysis capability detection request simultaneously, or may separately transmit the video processing capability detection request and the video analysis capability detection request.

Correspondingly, in response to the detection request transmitted by the cloud server, the terminal device may transmit both the video processing capability information and the video analysis capability information, or may separately transmit the video processing capability information and the video analysis capability information.

In the foregoing video processing collaboration method, the cloud server may determine a target video processing collaboration configuration according to a video processing capability of the terminal device. For example, the cloud server may allocate at least one image processing task to the cloud server or the terminal device, or collaboratively allocate at least one image processing task to the cloud server and the terminal device. In addition, the target video analysis collaboration configuration may be determined according to the video analysis capability of the terminal device. For example, the cloud server may allocate the at least one image analysis task to the cloud server or the terminal device, or allocate the at least one image analysis task to the cloud server and the terminal device. Therefore, when processing the target video, the cloud server can allocate tasks in combination with a processing capability and an analysis capability of the terminal device, so that an idle computing resource of the terminal device can be fully used with limited computing resources of the cloud server, so that processing and analysis can be performed on the target video as high as possible, thereby providing better cloud game picture quality.

Figure 4B:
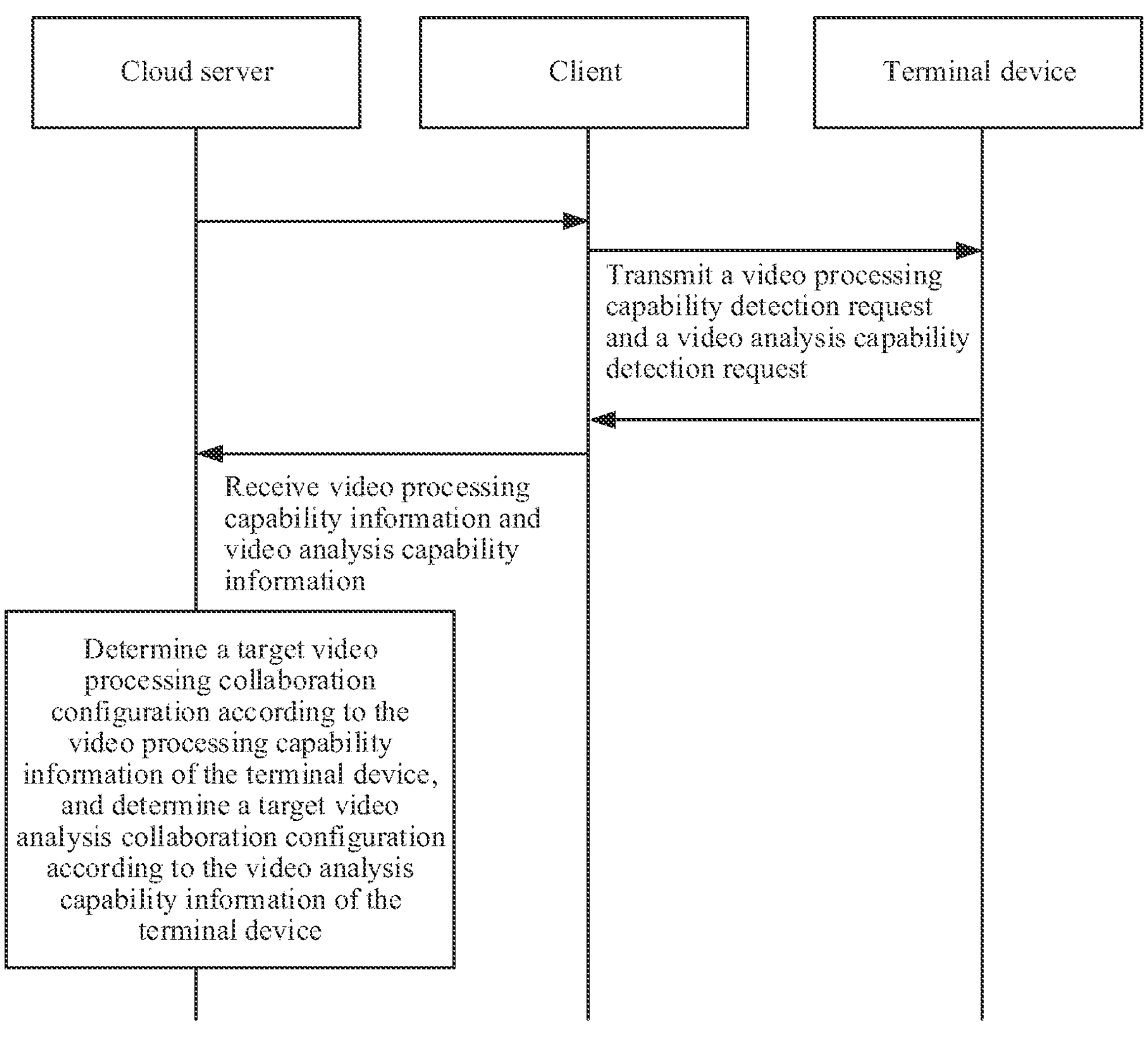
FIG. 4B is a flowchart of another video processing collaboration method according to some embodiments.

In some embodiments, as shown in FIG. 4B, the cloud server may transmit a video processing capability detection request and a video analysis capability detection request to the terminal device by using a client installed on the terminal device, and the terminal device may also return video processing capability information and video analysis capability information to the cloud server by using the client. In a cloud game scene, the client may be a cloud game client.

In some embodiments, the client may obtain the video processing capability information of the terminal device and the video analysis capability information of the terminal device from an operating system of the terminal device; transmit the video processing capability information and the video analysis capability information of the terminal device to the cloud server, so that the cloud server determines the target video processing collaboration configuration according to the video processing capability information of the terminal device, and determines the target video analysis collaboration configuration according to the video analysis capability information of the terminal device; and the client may receive the target video processing collaboration configuration and the target video analysis collaboration configuration, and transmit the target video analysis collaboration configuration to the terminal device. The terminal device may perform image analysis on the target video according to the target video analysis collaboration configuration, perform image processing on the target video according to the target video processing collaboration configuration, or perform analysis on the target video according to the target video analysis collaboration configuration and perform image processing on the target video according to the target video processing collaboration configuration.

In the foregoing video processing collaboration method, the client obtains the video processing capability information and the video analysis capability information from the operating system of the terminal device, and transmits the obtained video processing capability information and video analysis capability information to the cloud server, so that the cloud server determines the target video processing collaboration configuration and the target video analysis collaboration configuration according to the video processing capability information and the video analysis capability information. For example, the cloud server may allocate the at least one image processing task to the cloud server or the terminal device, or collaboratively allocate the at least one image processing task to the cloud server and the terminal device. For another example, the cloud server may allocate the at least one image analysis task to the cloud server or the terminal device, or collaboratively allocate the at least one image analysis task to the cloud server and the terminal device. Therefore, when processing the target video, the cloud server can allocate tasks in combination with a processing capability and an analysis capability of the terminal device, so that an idle computing resource of the terminal device can be fully used with limited computing resources of the cloud server, so that processing and analysis can be performed on the target video as high as possible, thereby providing better cloud game picture quality.

In some embodiments, the video processing capability detection request is used for requesting to obtain the video processing capability information of the terminal device. In some embodiments, the video processing capability detection request includes at least one of the following, but is not limited thereto: a protocol version number, a video resolution, a video frame rate, a queried processing algorithm type, or the like.

In some embodiments, the protocol version number refers to an earliest protocol version supported by the cloud server, and the protocol may be a rendering protocol.

In some embodiments, the video resolution, that is, a video size, may be a resolution of a to-be-image-processed video source, such as 1080p, 720p, or 360p.

In some embodiments, the video frame rate may be a frame rate of a to-be-image-processed video source, such as 120 fps, 60 fps, or 30 fps.

In some embodiments, the queried image processing algorithm type may be at least one of the following, but is not limited thereto: a sharpening processing algorithm, a noise reduction processing algorithm, a blur processing algorithm, or a video high dynamic range imaging (HDR) enhanced capability algorithm.

In some embodiments, different video resolutions may be defined in an enumeration manner, as shown in Table 1:

TABLE 1

| Video resolution | Enumeration definition |
|---|---|
| 360p | 0 × 1 |
| 576p | 0 × 2 |
| 720p | 0 × 4 |
| 1080p | 0 × 8 |
| 2k | 0 × 10 |
| 4k | 0 × 20 |

In some embodiments, different video frame rates may be defined in an enumeration manner, as shown in Table 2:

TABLE 2

| Video frame rate | Enumeration definition |
|---|---|
| 30 fps | 0 × 1 |
| 40 fps | 0 × 2 |
| 50 fps | 0 × 4 |
| 60 fps | 0 × 8 |
| 90 fps | 0 × 10 |
| 120 fps | 0 × 20 |

In some embodiments, different image processing algorithms may be defined in an enumeration manner, as shown in Table 3:

TABLE 3

| Image processing algorithm type | Enumeration definition |
|---|---|
| Not defined | 0 |
| Sharpening processing algorithm | 1 |
| HDR enhanced capability algorithm | 2 |

In some embodiments, the video processing capability detection request may be a video processing capability detection request transmitted by the cloud server for at least one image processing task of the target image frame.

For example, code implementation for transmitting the video processing capability detection request by the cloud server may be as follows:

```
{
"render_ability": {
"version": "1.0",
"resolution": "8",
"framerate": "8",
"type": "1,2"
}
}
```

In the above code, the first sentence is used for indicating a capability type requested to detect, such as "render_ability" (video processing capability), "analysis_ability" (video analysis capability), and the like. For example, "version" (protocol version number) and "resolution" (video size) are field types, and corresponding digits indicate values of their fields. For example, "resolution": "8" represents a video size (video resolution) of 1080p. For an explanation of each data structure in the code, refer to Table 5 below.

In some embodiments, the video analysis capability detection request is used for requesting to obtain the video analysis capability information of the terminal device.

In some embodiments, the video analysis capability detection request includes at least one of the following, but is not limited thereto: a protocol version number, a video resolution, a video frame rate, or a queried image analysis task type.

In some embodiments, the protocol version number refers to an earliest protocol version supported by the cloud server, and the protocol may be a video analysis protocol.

In some embodiments, the video resolution may be a resolution of a to-be-image-analyzed video source, such as 1080p.

In some embodiments, the video frame rate may be a frame rate of a to-be-image-analyzed video source, such as 60 fps.

In some embodiments, the queried image analysis task type may be at least one of the following, but is not limited thereto: video complexity analysis, video foreground and background analysis, or the like.

In some embodiments, different image analysis tasks may be defined in an enumeration manner, as shown in Table 4:

TABLE 4

| Image analysis task type | Enumeration definition |
|---|---|
| Not defined | 0 |
| Video complexity analysis | 1001 |
| Video foreground and background analysis | 1002 |

In some embodiments, the video analysis capability detection request may be a video analysis capability detection request transmitted by the cloud server for at least one image analysis task of the target video. The target video is a video to be image processed or analyzed. Generally, image analysis consumes a specific graphics computing resource. A result obtained by the cloud server by means of analysis is used for subsequently performing image processing. Therefore, a specific delay may be allowed, and analysis does not necessarily need to be performed on each frame. For example, the cloud server may perform image analysis on each four frames of images. Therefore, the image analysis task is intended for the target video.

It is assumed that the cloud server performs image analysis on each N frames of images, and N is an integer greater than 1. The image analysis may be image analysis performed on the N frames of images comprehensively, or may be image analysis performed on some image frames in the N frames of images.

For example, the image analysis task may be determining whether video scene switching occurs, or determining a region location of a specific object by means of analysis. The image analysis task may further be an analysis task of picture complexity, an analysis task of a game role motion track, or an analysis task of a foreground and a background.

For example, code implementation for transmitting the video analysis capability detection request by the cloud server may be as follows:

```
{
"analysis_ability": {
"version": "1.0",
"resolutuin": "8",
"framerate": "8",
"type": "1001"
}
}
```

For an explanation of each data structure in the code, refer to Table 5 below.

In some embodiments, when the technical solution of this application is applied to an RTC scene, the target video may be a video collected or generated in real time.

Data structures of the video processing capability information and the video analysis capability information of the terminal device may be shown in Table 5.

TABLE 5

| Section | Type | Section description |
|---|---|---|
| [render_ability] | — | Image processing capability |
| [analysis_ability] | — | Image analysis capability |
| [render_task] | — | Image processing task |
| [analysis_task] | — | Image analysis task |
| [renderN] | — | Image processing algorithm, where N is a value 1, 2, 3, . . . |

TABLE 5-continued

| | | |
|---|---|---|
| [analysisN] | — | Image analysis algorithm, where N is a value 1, 2, 3, . . . |
| [renderN_args] | — | Image processing algorithm parameter, where N is a value 1, 2, 3, . . . |
| [analysisN_args] | — | Image analysis algorithm parameter, where N is a value 1, 2, 3, . . . |

| Key | Type | Value description |
|---|---|---|
| resolution | Enumerated | Video size |
| frame rate | Enumerated | Video frame rate |
| name | String | Algorithm name |
| type | Enumerated | Image processing algorithm type/image analysis algorithm type<br>0: Not defined;<br>1: Image sharpening algorithm;<br>2: HDR algorithm;<br>3: Video image mode;<br>1001: Video image complexity analysis;<br>1002: Foreground and background analysis of a video image; |
| renders | Integer type | Quantity of image processing algorithms. When the quantity of cascaded image processing algorithms is N, N sections are subsequently immediately followed: respectively [render1], [render2], . . . , [renderN], which identify specific information of the N image processing algorithms. |
| analyses | Integer type | Quantity of image analysis algorithms. When of image analysis the quantity algorithms is N, N sections are subsequently immediately followed: respectively [analysis1], [analysis2], . . . , [analysisN], which identify specific N image analysis algorithms. |
| performances | Integer type | Quantity of processing/analysis performance indexes of the terminal device. When a quantity of performance indicators of a decoder is N, N keys are subsequently immediately followed: respectively performance1, performance2, . . . , performanceN, which identify specific content of N performance indicators. |
| performanceN | String (Triplet) | N is a value 1, 2, 3, . . . , and represents a performance data triplet supported by an intelligent terminal. The first element is a video size, the second element is a video frame rate, and the third element is a single-frame image processing delay, in a unit of milliseconds. If a delay of the terminal device in performing single-frame image processing on videos of 1080p and 60 fps is 5 ms, it is represented as performanceN = 8, 8, 5. |
| scale | Integer type | Indicates a scaling scale of rectangular region coordinates. If there is no such field, it is identified as a full picture region. |
| regions | Integer type | Integer type. Quantity of rectangular regions. When a quantity of rectangular regions in an image is N, N keys are subsequently immediately followed: respectively region1, region2, . . . , regionN, which identify specificN rectangular regions. If there is no such field, it is identified as a full picture region. |
| regionN | Integer type | N is a value 1, 2, 3, . . . , and indicate rectangular regions, which are the left, upper, right and lower coordinates of rectangular coordinates. The values are scaled according to a scale value. For example, for a video image size of width*height, rectangular region coordinates of a rectangular region represented by a rectangular region = l, t, r, b are:<br>left = floor(width*l/scale)<br>upper = floor(height*t/scale)<br>right = ceil(width*r/scale) − 1<br>lower = ceil(height*b/scale) − 1 |
| arg1 . . . argN | Determined by algorithms | Image enhancement algorithm parameters/image analysis algorithm parameters, specified by a specific algorithm. |

The video processing capability information of the terminal device refers to a protocol version number, a video resolution, a video frame rate, an image processing algorithm type, or the like supported by the terminal device when executing an image processing task.

In some embodiments, a protocol version number supported when the terminal device executes an image analysis task refers to an earliest protocol version supported by the terminal device, and the protocol may be an image processing protocol.

In some embodiments, the video image processing capability of the terminal device includes at least one of the following, but is not limited thereto: an image processing algorithm type supported by the terminal device and performance of the image processing algorithm.

In some embodiments, the performance of the image processing algorithm includes at least one of the following, but is not limited thereto: a video size, a frame rate, and a delay that can be processed by the image algorithm.

In some embodiments, in addition to feeding back the video processing capability information to the cloud server, the terminal device may further feed back, to the cloud server, an identifier indicating whether an image processing algorithm type to be queried by the cloud server is successfully queried.

In some embodiments, when the processing algorithm type to be queried by the cloud server is successfully queried, the identifier indicating whether the processing algorithm type to be queried by the cloud server is successfully queried may be represented by 0. When the processing algorithm type to be queried by the cloud server fails to be queried, the identifier indicating whether the processing algorithm type to be queried by the cloud server is successfully queried may be represented by an error code, such as 001.

For example, when the terminal device has the video processing capability, code implementation in which the terminal device feeds back the video processing capability information may be as follows:

```
{
"render_ability": {
"state": "0",
"version": "1.0",
"renders": "2"
},
"render1": {
"type": "1",
"performances": "1",
"performance1": "8,8,10"
},
"render2": {
"type": "2",
"performances": "1",
"performance1": "8,8,5"
}
}
```

For example, when the terminal device has a partial video processing capability, code implementation in which the terminal device feeds back the video processing capability information may be as follows:

```
{
"render_ability": {
"state": "0",
"version": "1.0",
"renders": "1"
},
"render1": {
"type": "2",
"performances": "1",
"performance1": "8,8,5"
}
}
```

For example, when the terminal device does not have the video processing capability, code implementation in which the terminal device feeds back the video processing capability information may be as follows:

```
{
"render_ability": {
"state": "0",
"version": "1.0",
"renders": "0"
}
}
```

For example, when the protocol fails to be requested, code implementation in which the terminal device feeds back the video processing capability information may be as follows:

```
{
"render_ability": {
"state": "-1",
"version": "0.9"
}
}
```

It is to be understood that for explanation of each data structure in these codes, refer to Table 5.

In some embodiments, in the foregoing at least one image processing task, each image processing task is corresponding to at least one image processing algorithm. For example, one image processing task can only be processed by using one image processing algorithm, and therefore, the image processing task has a correspondence with the image processing algorithm. For another example, one image processing task may be processed by using multiple image processing algorithms, and therefore, the image processing task has a correspondence with each of the multiple image processing algorithms.

In some embodiments, the at least one image processing algorithm includes at least one of the following, but is not limited thereto: a sharpening processing algorithm, a noise reduction processing algorithm, or a blur processing algorithm.

For example, it may be assumed that blur processing needs to be performed on a background image of a video image frame in the target video, and noise reduction processing and sharpening processing need to be performed on a foreground image. In this case, the image frame corresponds to three image processing tasks: a blur processing task, a noise reduction processing task, and a sharpening processing task. Image processing algorithms respectively corresponding to the three tasks are a blur processing algorithm, a noise reduction processing algorithm, and a sharpening processing algorithm.

The video analysis capability information of the terminal device refers to a protocol version number, a video resolution, a video frame rate, an image analysis algorithm type, or the like supported by the terminal device when executing an image analysis task.

In some embodiments, a protocol version number supported when the terminal device executes an image analysis task refers to an earliest protocol version supported by the terminal device, and the protocol may be a video analysis protocol.

In some embodiments, the video analysis capability of the terminal device includes at least one of the following, but is not limited thereto: A video analysis algorithm type supported by the terminal device and performance of the video analysis algorithm.

In some embodiments, the performance of the video analysis algorithm includes at least one of the following, but is not limited to: a video size, a frame rate, and a delay that can be processed by the algorithm.

In some embodiments, in addition to feeding back the video analysis capability information to the cloud server, the terminal device may further feed back, to the cloud server, an identifier indicating whether an analysis task type to be queried by the cloud server is successfully queried.

In some embodiments, when the analysis task type to be queried by the cloud server is successfully queried, the identifier indicating whether the analysis task type to be queried by the cloud server is successfully queried may be represented by 0. When the analysis task type to be queried by the cloud server fails to be queried, the identifier indicating whether the analysis task type to be queried by the cloud server is successfully queried may be represented by an error code, such as 001.

For example, code implementation in which the terminal device feeds back the video analysis capability information to the cloud server may be as follows:

```
{
"analysis_ability": {
"state": "0",
"version": "1.0",
"analyses": "1"
},
```

-continued

```
"analysis1": {
"type": "1001",
"performances": "1",
"performance1": "8,8,10"
}
}
```

It is to be understood that for explanation of each data structure in these codes, refer to Table 5.

In some embodiments, in the foregoing at least one image analysis task, each image analysis task is corresponding to at least one image analysis algorithm. For example, one image analysis task can only be processed by using one image analysis algorithm, and therefore, the image analysis task has a correspondence with the image analysis algorithm. For another example, one image analysis task may be processed by using multiple image analysis algorithms, and therefore, the image analysis task has a correspondence with each of the multiple image analysis algorithms.

In some embodiments, the image analysis task is used for assisting at least one of the following processing: image coding of the cloud server, image processing of the cloud server, and image processing of the terminal device.

Figure 5:
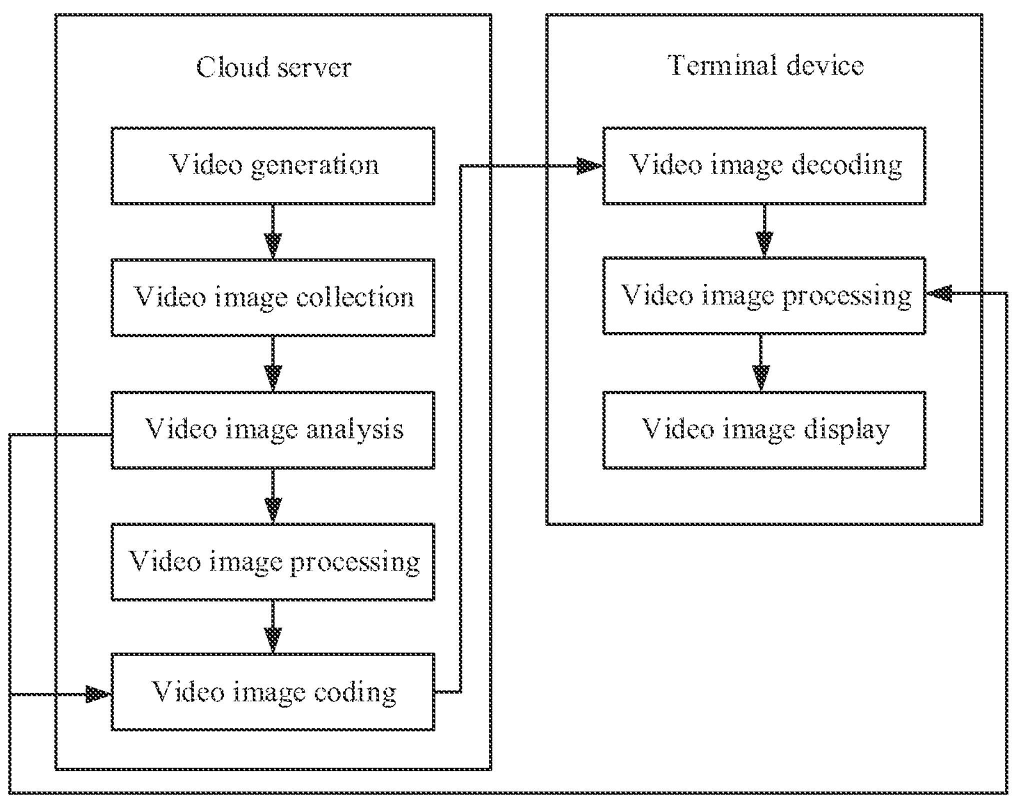
FIG. 5 is a flowchart of still another image processing process according to some embodiments.

For example, as shown in FIG. 5, the cloud server generates a video, collects a video image, performs video image analysis on the collected video image, performs image processing such as sharpening processing, blur processing, and noise reduction processing on the video image according to an analysis result, and codes the image-processed video image according to the analysis result to obtain a code stream of the video image. Further, the cloud server may transmit the code stream to the terminal device, the terminal device decodes the code stream, and performs image processing such as sharpening processing, blur processing, and noise reduction processing on the decoded video image according to an analysis result of the cloud server, and then the terminal device displays the image-processed video image.

Figure 6:
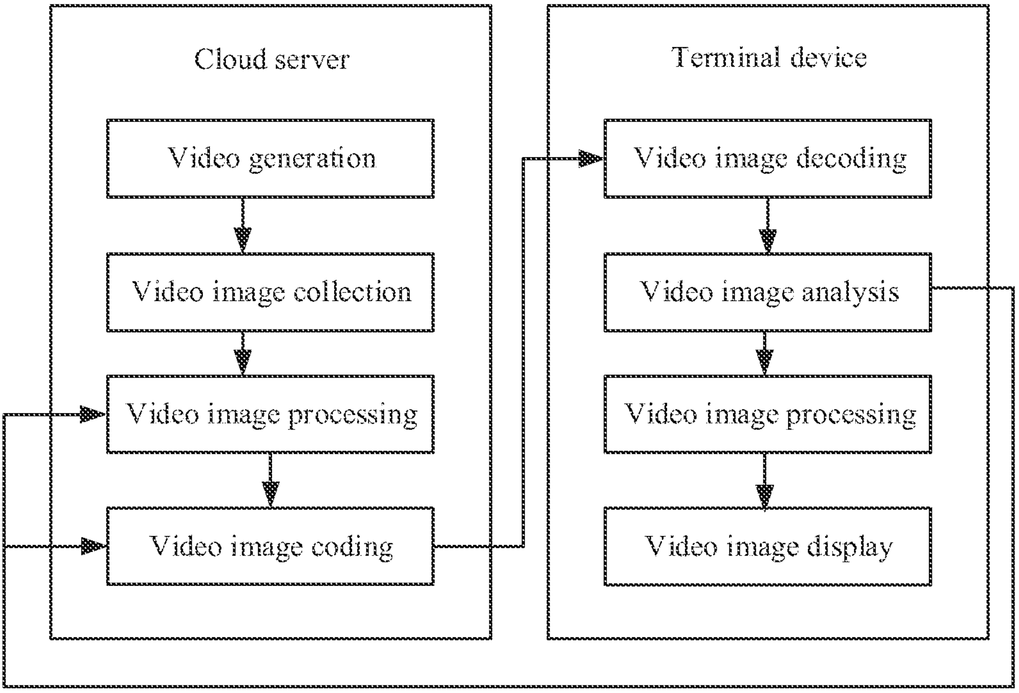
FIG. 6 is a flowchart of yet another image processing process according to some embodiments.

For example, as shown in FIG. 6, the cloud server generates a video, collects a video image, performs image processing on the video image according to an analysis result of a decoded video image by the terminal device, such as sharpening processing, blur processing, and noise reduction processing, and then codes, according to the analysis result of the decoded video image by the terminal device, the processed video image to obtain a code stream of the video image. Further, the cloud server may transmit the code stream to the terminal device, the terminal device decodes the code stream, analyzes the decoded video image, and processes the video image according to the analysis result, such as sharpening processing, blur processing, and noise reduction processing. Finally, the terminal device displays a processed video image.

Figure 7:
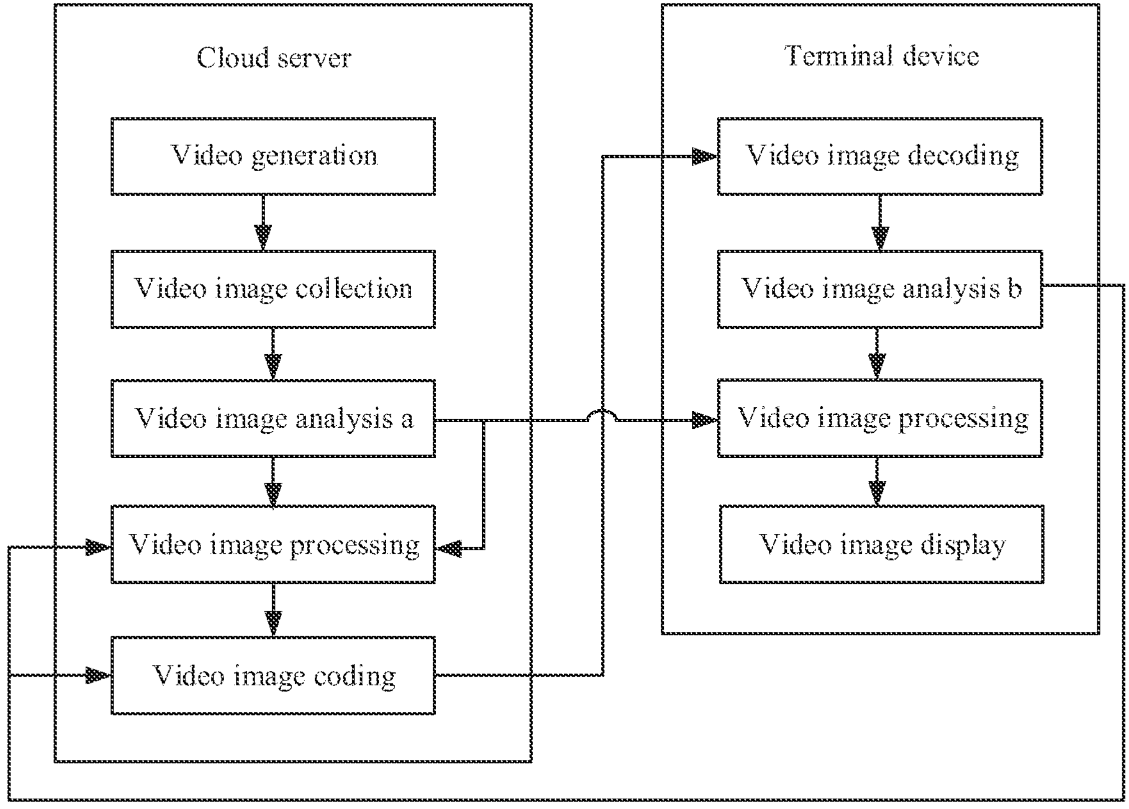
FIG. 7 is a flowchart of still another image processing process according to some embodiments.

For example, as shown in FIG. 7, the cloud server generates a video, collects a video image, performs image analysis on the collected video image, corresponds to an image analysis task a, performs image processing on the collected video image according to an analysis result corresponding to an image analysis task b on the side of the terminal device, codes the image-processed video image according to the analysis result corresponding to the image analysis task a and the analysis result corresponding to the image analysis task b on the side of the terminal device, to obtain a code stream of the video image. Further, the cloud server may transmit the code stream to the terminal device. The terminal device decodes the code stream, analyzes the decoded video image, corresponds to the image analysis task b, performs image processing on the video image according to the analysis result of the image analysis task a on the side of the cloud server, and finally displays the image-processed video image.

In some embodiments, the video analysis capability of the terminal device may be divided into the following three cases:

Case 1: The video analysis capability of the terminal device has a full video analysis capability for at least one image analysis task. That the terminal device has a full video analysis capability means that a software and hardware condition of the terminal device in processing an image analysis task can meet a task requirement.

Case 2: The video analysis capability of the terminal device has a local video analysis capability for at least one image analysis task. That the terminal device has a local video analysis capability means that a software and hardware condition of the terminal device in processing an image analysis task can only meet some task requirements.

Case 3: The terminal device does not have a video analysis capability.

Different video analysis capabilities of the terminal device may be defined in an enumeration manner, as shown in Table 6.

TABLE 6

| Video analysis capability | Enumeration definition |
|---|---|
| Not defined | 0 |
| Not have a video analysis capability | 1 |
| Have a local video analysis capability | 2 |
| Have a full video analysis capability | 3 |

In some embodiments, the determining a target video analysis collaboration configuration according to the video analysis capability information of the terminal device includes: determining, in a case that the terminal device has a full video analysis capability for the at least one image analysis task, that the target video analysis collaboration configuration is the video analysis collaboration configuration that allocates the at least one image analysis task to the terminal device. That is, the cloud server receives the video analysis capability information fed back by the terminal device, and determines the video analysis capability of the terminal device according to the video analysis capability information of the terminal device. When determining that the terminal device has a full video analysis capability for the at least one image analysis task, the cloud server determines to allocate the at least one image analysis task to the terminal device, that is, the cloud server determines that the target video analysis collaboration configuration is the video analysis collaboration configuration that allocates the at least one image analysis task to the terminal device.

In some embodiments, the determining a target video analysis collaboration configuration according to the video analysis capability information of the terminal device includes: determining, in a case that the terminal device has a full video analysis capability for the at least one image analysis task, that the target video analysis collaboration configuration is the video analysis collaboration configuration that allocates the at least one image analysis task to the terminal device; and determining, in a case that the terminal device has a full video analysis capability for the at least one image analysis task, that the target video analysis collaboration configuration is the video analysis collaboration configuration that allocates the at least one image analysis task to the cloud server.

That is, the cloud server receives the video analysis capability information fed back by the terminal device, and determines the video analysis capability of the terminal device according to the video analysis capability information of the terminal device. When determining that the terminal device does not have the full video analysis capability for the at least one image analysis task, the cloud server determines to allocate the at least one image analysis task to the cloud server, that is, the cloud server determines that the target video analysis collaboration configuration is the video analysis collaboration configuration that allocates the at least one image analysis task to the cloud server.

In some embodiments, the determining a target video analysis collaboration configuration according to the video analysis capability information of the terminal device includes: determining, in a case that the terminal device has a local video analysis capability for the at least one image analysis task, that the target video analysis collaboration configuration is the video analysis collaboration configuration that allocates the at least one image analysis task to the terminal device and the cloud server. That is, the cloud server receives the video analysis capability information fed back by the terminal device, and determines the video analysis capability of the terminal device according to the video analysis capability information of the terminal device. When determining that the terminal device has the local video analysis capability for the at least one image analysis task, the cloud server determines to collaboratively allocate the at least one image analysis task to the terminal device and the cloud server. In other words, the cloud server determines that the target video analysis collaboration configuration is the video analysis collaboration configuration that collaboratively allocates the at least one image analysis task to the terminal device and the cloud server. For example, the cloud server allocates a part of image analysis tasks to the terminal device, and allocates another part of the image analysis tasks to the cloud server.

In some embodiments, the determining a target video analysis collaboration configuration according to the video analysis capability information of the terminal device includes: determining, in a case that the terminal device does not have a video analysis capability, that the target video analysis collaboration configuration is the video analysis collaboration configuration that allocates the at least one image analysis task to the cloud server. That is, the cloud server receives the video analysis capability information fed back by the terminal device, and determines the video analysis capability of the terminal device according to the video analysis capability information of the terminal device. When determining that the terminal device does not have the video analysis capability, the cloud server determines to allocate the at least one image analysis task to the cloud server. In other words, the cloud server determines that the target video analysis collaboration configuration is the video analysis collaboration configuration that allocates the at least one image analysis task to the cloud server.

Whether the terminal device has the video analysis capability may be whether the video analysis capability of the terminal device meets a requirement of the image analysis task.

In the foregoing embodiment, by determining whether the terminal device has a full video analysis capability, has a local video analysis capability, or does not have a video analysis capability, an allocation of image analysis tasks can be further subdivided, and all image analysis tasks may be executed by the terminal device, or the image analysis tasks may be split into two parts, one part is executed by the terminal device, and the other part is executed by the cloud server, or all the image analysis tasks may be executed by the cloud server itself. Therefore, processing resources of the cloud server and the terminal device can be fully used, and the cloud server and the terminal device can cooperate with each other in processing tasks, thereby improving processing efficiency of the target video.

In some embodiments, whether the video analysis capability of the terminal device meets a requirement of any image analysis task is as follows: The terminal device has a basic capability of processing the image analysis task, and the video analysis capability of the terminal device meets the requirement of the image analysis task.

In some embodiments, that the terminal device has a basic capability of processing the image analysis task includes: a software and hardware capability of the terminal device to execute the image analysis task, where the software and hardware capability includes a software capability and a hardware capability.

For example, assuming that a specific physical region location of the target video currently needs to be determined, that the terminal device has a basic capability of performing the task means that the terminal device may determine the specific physical region location of the target video by using software and hardware.

In some embodiments, the cloud server determines whether the terminal device meets a software and hardware capability condition for executing the image analysis task. When the terminal device does not meet the software and hardware capability condition for executing the image analysis task, the cloud server determines that the video analysis capability of the terminal device does not meet the requirement of the image analysis task.

In some embodiments, when the terminal device meets the software and hardware capability condition for executing the image analysis task, the cloud server continues to determine whether an image analysis algorithm used in a case that the terminal device executes the image analysis task meets a performance requirement of a target video corresponding to the at least one image analysis task.

In some embodiments, when the image analysis algorithm used in a case that the terminal device executes the image analysis task does not meet the performance requirement of the target video, the cloud server determines that the video analysis capability of the terminal device does not meet the requirement of the image analysis task.

In some embodiments, when the image analysis algorithm used in a case that the terminal device executes the image analysis task meets the performance requirement of the target video, the cloud server determines that the video analysis capability of the terminal device meets the requirement of the image analysis task.

In some embodiments, that the cloud server determines whether an image analysis algorithm used in a case that the terminal device executes the image analysis task meets a performance requirement of a target video corresponding to the at least one image analysis task includes: determining, in a case that an image region to be processed by the image analysis algorithm is a preset region and an image analysis frequency is a preset analysis frequency and that performance of the image analysis algorithm meets a resolution requirement and a frame rate requirement of the target video, that the image analysis algorithm meets the performance requirement of the target video; and determining, in a case that an image region to be processed by the image analysis algorithm is a preset region and an image analysis frequency is a preset analysis frequency and that performance of the image analysis algorithm does not meet a resolution requirement or a frame rate requirement of the target video, that the image analysis algorithm does not meet the performance requirement of the target video.

The cloud server presets an image region to be processed by the image analysis algorithm, that is, the preset region, and presets an image analysis frequency, that is, the preset analysis frequency. When an image region and an image analysis frequency are preset, the cloud server determines, according to the video analysis capability information fed back by the terminal device, the image analysis algorithm used in a case that the terminal device executes the image analysis task, and further determines whether performance of the image analysis algorithm used in a case that the terminal device executes the image analysis task meets the resolution requirement and the frame rate requirement of the target video.

When the performance of the image analysis algorithm used in a case that the terminal device executes the image analysis task can meet the resolution requirement and the frame rate requirement of the target video, the cloud server determines that the image analysis algorithm supported by the terminal device meets the performance requirement of the target video.

When the performance of the image analysis algorithm used in a case that the terminal device executes the image analysis task does not meet any one of the resolution requirement or the frame rate requirement of the target video, it is determined that the image analysis algorithm does not meet the performance requirement of the target video.

In the foregoing embodiment, whether the terminal device has the software and hardware capability for executing the image analysis task is determined, and further, when the terminal device has the software and hardware capability for executing the image analysis task, it is further determined whether the image analysis algorithm used in a case that the terminal device re-executes the image analysis task can meet the performance requirement of the target video, so that it can be accurately determined whether the image analysis task is allocated to the terminal device, thereby avoiding reduced efficiency caused by allocating the image analysis task to the terminal device when the terminal device does not have the software and hardware capability, implementing fine task allocation, and improving implementability and execution efficiency of the allocated task. In some embodiments, the image analysis frequency refers to performing image analysis for every N frames of images, where N is an integer greater than 1.

For example, it is assumed that for a target video of 1080p and 60 fps, currently, image analysis may need to be performed on the target video every four frames of images, and only an image center 1/9 region may need to be analyzed. In this case, the performance requirement of the image analysis algorithm is 360p and 15 fps.

Based on the foregoing video analysis capability division status of the terminal device, an allocation status of the at least one image analysis task may be as follows:

In some embodiments, for the at least one image analysis task, when the video analysis capability of the terminal device meets requirements of all image analysis tasks, the cloud server allocates all the image analysis tasks to the terminal device. When the video analysis capability of the terminal device meets requirements of some tasks in the at least one image analysis task, the cloud server allocates the some tasks to the terminal device, and allocates other tasks than the some tasks to the cloud server. When the video analysis capability of the terminal device does not meet a requirement of any image analysis task, the cloud server allocates all image analysis tasks to the cloud server.

For example, it is assumed that for a target video of 1080p and 60 fps, if image analysis may need to be performed on the target video every four frames of images currently, and only an image center 1/9 region may need to be analyzed, the method includes: determining whether video scene switching occurs and determining a region location of a specific object; that is, there are two image analysis tasks for the target video, which are respectively: a task of determining whether video scene switching occurs and a task of determining the region location of the specific object.

Based on this, if the video analysis capability of the terminal device can meet requirements of the two tasks, that is, the terminal device has a basic capability of executing the two tasks, and performance of image analysis algorithms corresponding to the two tasks may reach 360p and 15 fps. In this case, the cloud server may allocate the two tasks to the terminal device, so that the terminal device performs the two tasks, thereby reducing loads of the cloud server.

If the capability of the terminal device can meet the requirement of one of the two tasks, in this case, the cloud server may allocate the task met by the terminal device to the terminal device, and the remaining task is allocated to the cloud server, so that the terminal device and the cloud server cooperate to execute the two tasks.

If the video analysis capability of the terminal device cannot meet any one of the two tasks of the image, in this case, the cloud server may allocate the two tasks to the terminal device, so that the terminal device performs the two tasks, thereby reducing loads of the terminal device.

It is to be understood that the foregoing describes three cases into which the video analysis capability of the terminal device is divided. Actually, the video analysis capability of the terminal device may also be divided into the following two cases:

Case 1: The terminal device has a full video analysis capability for the at least one image analysis task.

Case 2: The terminal device does not have a full video analysis capability for the at least one image analysis task.

In other words, the at least one image analysis task is considered as a whole.

It is to be understood that, for whether the video analysis capability of the terminal device meets a requirement of a task, refer to the foregoing explanation and description.

Based on the foregoing video analysis capability division status of the terminal device, the allocation status of the at least one image analysis task may be as follows: If the video analysis capability of the terminal device meets the requirement of the at least one image analysis task, the at least one image analysis task is allocated to the terminal device. If the video analysis capability of the terminal device does not meet the requirement of the at least one image analysis task, the at least one image analysis task is allocated to the cloud server.

For example, it is assumed that for a target video of 1080p and 60 fps, if image analysis may need to be performed on the target video every four frames of images currently, and only an image center 1/9 region may need to be analyzed, the method includes: determining whether video scene switching occurs and determining a region location of a specific object; that is, there are two image analysis tasks for the target video, which are respectively: a task of determining whether video scene switching occurs and a task of determining the region location of the specific object.

Based on this, if the video analysis capability of the terminal device can meet requirements of the two tasks, that is, the terminal device has a basic capability of executing the two tasks, and performance of image analysis algorithms corresponding to the two tasks may reach 360p and 15 fps. In this case, the cloud server may allocate the two tasks to the terminal device, so that the terminal device performs the two tasks, thereby reducing loads of the cloud server.

If the video analysis capability of the terminal device can meet the requirement of either of the two tasks, or cannot meet the requirement of any one of the two tasks, in this case, both the two tasks may be allocated to the cloud server, so that the cloud server performs the two tasks, thereby reducing loads of the terminal device.

In some embodiments, an identifier of a first image analysis task and first indication information are transmitted to the terminal device in a case that it is determined that the target video analysis collaboration configuration is the video analysis collaboration configuration that allocates the at least one image analysis task to the terminal device, the first image analysis task being an image analysis task allocated to the terminal device, and the first indication information being used for indicating the terminal device to perform image analysis on the allocated at least one image analysis task.

In the foregoing embodiment, by transmitting the identifier of the first image analysis task and the first indication information to the terminal device, the terminal device may learn of the to-be-processed image analysis task according to the identifier, and perform image analysis on the to-be-processed image analysis task according to the first indication information. Therefore, the terminal device can help the cloud server execute the image analysis task, reduce resource pressure of the cloud server, and make full use of resources of the terminal device.

In some embodiments, an identifier of a second image analysis task and second indication information are transmitted to the terminal device in a case that it is determined that the target video analysis collaboration configuration is the video analysis collaboration configuration that collaboratively allocates the at least one image analysis task to the terminal device and the cloud server, the second image analysis task being an image analysis task that may need to be allocated to the terminal device in the at least one image analysis task, and the second indication information being used for indicating the terminal device to perform image analysis on the second image analysis task.

In the foregoing embodiment, by transmitting the identifier of the second image analysis task and the second indication information to the terminal device, the terminal device may learn of the to-be-processed image analysis task according to the identifier, and perform image analysis on the to-be-processed image analysis task according to the second indication information. Therefore, the terminal device can help the cloud server execute the image analysis task, reduce resource pressure of the cloud server, and make full use of resources of the terminal device.

The identifier of the image analysis task is used for distinguishing different image analysis tasks. For example, each image analysis task is set with a number, and the number is used as the identifier of the image analysis task, so as to notify the terminal device of a specific image analysis task allocated.

In some embodiments, when the cloud server delivers the image processing task to the terminal device, information about the image processing task may also be delivered to the terminal device. The information about the image processing task includes at least one of the following, but is not limited thereto: a type of the image processing algorithm, a name, a size, a quantity of regions, a region range, a threshold, or the like.

For example, code implementation in which the cloud server delivers the image processing task may be as follows. The algorithm corresponding to the image processing task is an image sharpening algorithm for an image region:

```
{
"render_task": {
"version": "1.0",
"renders": "1"
},
"render1": {
"type": "1",
"name": "unsharp masking",
"scale": "100",
"regions": "2",
"region1": "0,0,33,33",
"region2": "67,67,100,100"
},
"render1_args": {
"threshold": "0",
"amount": "50",
"radius": "5"
}
}
```

For example, code implementation in which the cloud server delivers the image processing task may be as follows. The algorithm corresponding to the image processing task is an image sharpening algorithm for an image region and a full picture HDR:

```
{
"render_task": {
"version": "1.0",
"renders": "2"
},
"render1": {
"type": "1",
"name": "unsharp masking",
"scale": "100",
"regions": "2",
"region1": "0,0,33,33",
"region2": "67,67,100,100"
},
"render1_args": {
"threshold": "0",
"amount": "50",
"radius": "5"
},
"render2": {
"type": "2",
"name": "hdr",
"scale": "100",
"regions": "1",
"region1": "0,0,100,100"
}
}
```

It is to be understood that for explanation of each data structure in these codes, refer to Table 5.

In some embodiments, when the cloud server delivers the image analysis task to the terminal device, information about the image analysis task may also be delivered to the terminal device. The information about the image analysis task includes at least one of the following, but is not limited thereto: a type of the image analysis algorithm, a name, a size, a quantity of regions, a region range, a threshold, or the like.

Certainly, the cloud server may deliver both an image processing task and an image analysis task.

For example, code implementation in which the cloud server delivers both the image processing task and the image analysis task may be as follows. The image analysis task is, for example, a video complexity analysis task, and the image processing task is, for example, a full picture HDR task:

```
{
"render_task": {
"version": "1.0",
"renders": "1"
},
"render1": {
"type": "2",
"name": "hdr",
"scale": "100",
"regions": "1",
"region1": "0,0,100,100"
},
"analysis_task": {
"version": "1.0",
"analyses": "1"
},
"analysis1": {
"type": "1002",
"name": "xxx",
"scale": "100",
"regions": "1",
"region1": "33,33,67,67"
}
}
```

Figure 8:
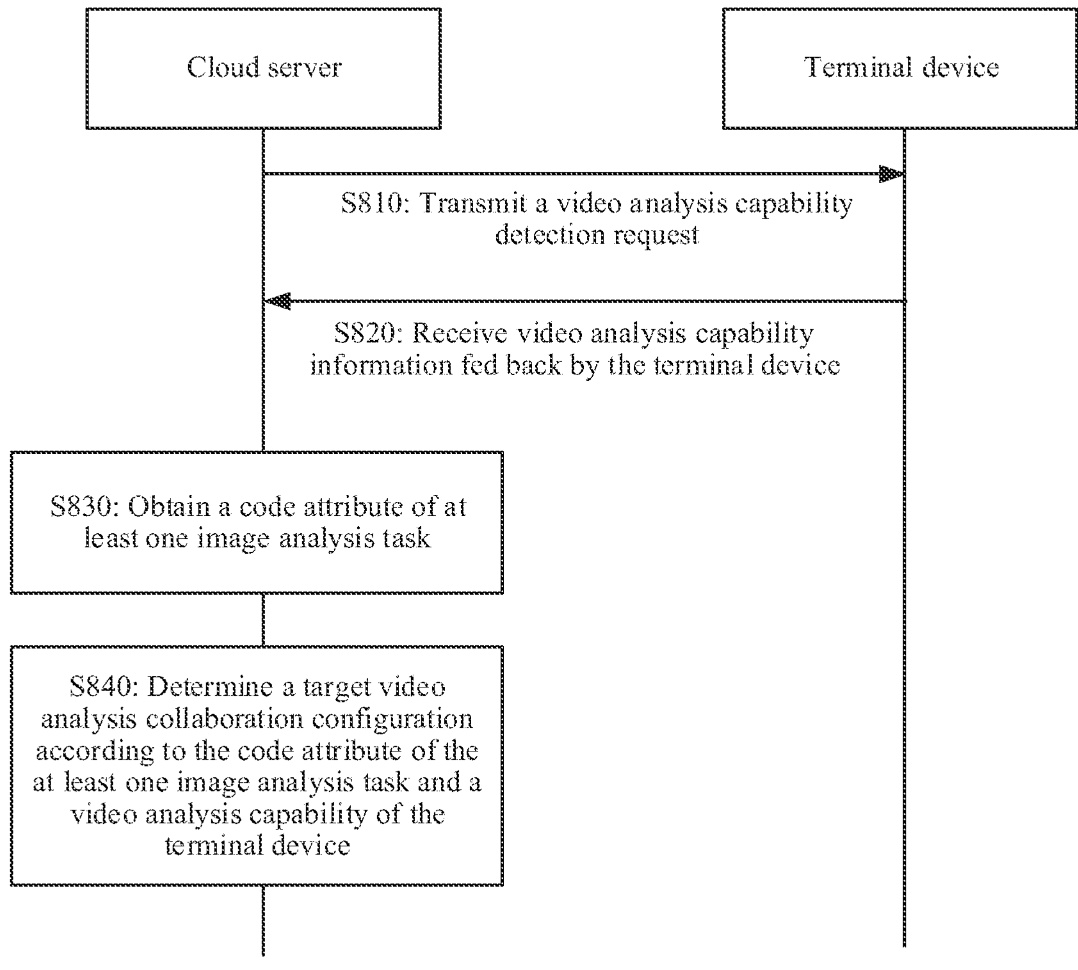
FIG. 8 is a flowchart of still another video processing collaboration method according to some embodiments.

FIG. 8 is a flowchart of still another video processing collaboration method according to some embodiments. As shown in FIG. 8, the method includes the following steps:

S810: A cloud server transmits a video analysis capability detection request to a terminal device.

S820: The cloud server receives video analysis capability information fed back by the terminal device in response to the video analysis capability detection request.

S830: The cloud server obtains a code attribute of at least one image analysis task.

S840: The cloud server determines a target video analysis collaboration configuration according to the code attribute of the at least one image analysis task and a video analysis capability of the terminal device.

For explanation and description of the same steps of the embodiment corresponding to FIG. 8 and the embodiment corresponding to FIG. 4A, references may be made to the foregoing.

It is to be understood that, generally, the cloud server has a very strong image processing capability relative to the terminal device. For an image analysis task with relatively high coding complexity, a relatively high coding quality requirement, or a relatively high coding delay requirement, the image analysis task may be generally performed only by the cloud server.

In some embodiments, the cloud server determines, according to the code attribute of the at least one image analysis task, whether an image analysis task to be allocated to the cloud server exists in the at least one image analysis task; if an image analysis task to be allocated to the cloud server exists in the at least one image analysis task, allocates the image analysis task to be allocated to the cloud server to the cloud server, and determines whether a remaining image analysis task exists in the at least one image analysis task except the image analysis task to be allocated to the cloud server; if an image analysis task to be allocated to the cloud server does not exist in the at least one image analysis task, determines the target video analysis collaboration configuration according to the video analysis capability of the terminal device; and if a remaining image analysis task exists in the at least one image analysis task, determines a target video analysis collaboration configuration for the remaining image analysis task according to the video analysis capability of the terminal device.

In the foregoing embodiment, the target video analysis collaboration configuration is determined according to the code attribute of the image analysis task and with reference to the code attribute and the video analysis capability, so as to determine whether the image analysis task is allocated to the terminal device or the cloud server, and which image analysis task is to be allocated to the terminal device. Therefore, fine allocation of the image analysis task is implemented, which can fully allocate an idle resource of the terminal device, avoid impact of excessive tasks on performance of the terminal device, and consider processing efficiency and processing effect of the target video.

In some embodiments, the foregoing method further includes: determining an image analysis task in the at least one image analysis task and whose code attribute meets a preset condition as an image analysis task to be allocated to the cloud server. The preset condition refers to one or more of a coding complexity condition, a coding quality condition, or a coding delay condition. Therefore, the image analysis task to be allocated to the cloud server is determined by determining whether the code attribute meets a preset condition, and an image analysis task with relatively high coding complexity, a relatively high coding quality requirement, or a relatively high coding delay requirement can be allocated to the cloud server, thereby avoiding impact on performance of the terminal device, and avoiding impact on processing efficiency of the target video when performance of the terminal device is insufficient.

In some embodiments, the code attribute of the image analysis task is any one of the following, but is not limited thereto: coding complexity, coding quality, and a coding delay.

It is to be understood that higher coding complexity, coding quality, and coding delay of an image analysis task indicates that processing of the image analysis task is more difficult. Therefore, herein, whether to allocate the image analysis task to the cloud server is determined by using these code attributes.

In some embodiments, the preset condition corresponding to the coding complexity of the image analysis task is to determine whether the coding complexity of the image analysis task reaches preset coding complexity. When the preset coding complexity is reached, the cloud server determines that the code attribute of the image analysis task meets the preset condition corresponding to the coding complexity.

In some embodiments, a preset condition corresponding to the coding quality of the image analysis task is to determine whether the coding quality of the image analysis task reaches preset coding quality. When the preset coding quality is reached, the cloud server determines that the code attribute of the image analysis task meets the preset condition corresponding to the coding quality.

In some embodiments, a preset condition corresponding to the coding delay of the image analysis task is to determine whether the coding delay of the image analysis task reaches a preset coding delay. When the preset coding delay is reached, the cloud server determines that the code attribute of the image analysis task meets the preset condition corresponding to the coding delay.

In some embodiments, any one of the foregoing preset condition, preset coding complexity, preset coding quality, or preset coding delay of the image analysis task may be negotiated by the cloud server and the terminal device, or may be predefined, or may be specified by the cloud server, or may be specified by the terminal device, or may be specified by an application layer of the terminal device. This is not limited in this application.

In the foregoing embodiment, the target video analysis collaboration configuration is determined according to the code attribute of the image analysis task and with reference to the code attribute and the video analysis capability, so as to determine whether the image analysis task is allocated to the terminal device or the cloud server, and which image analysis task is to be allocated to the terminal device. Therefore, fine allocation of the image analysis task is implemented, which can fully allocate an idle resource of the terminal device, avoid impact of excessive tasks on performance of the terminal device, and consider processing efficiency and processing effect of the target video.

For example, it is assumed that for a target video of 1080p and 60 fps, currently, the target video may need to be analyzed, so as to determine whether there is video scene switching, determine a region location of a game role A, and determine a region location of a game role B, that is, three image analysis tasks exist. It is assumed that coding complexity of an image analysis task for determining whether there is video scene switching is greater than the preset coding complexity, and that coding complexity of an image analysis task for determining the region location of the game role A and coding complexity of an image analysis task for determining the region location of the game role B are less than preset coding complexity. Based on this, the cloud server may allocate the image analysis task to the cloud server. Further, it is assumed that for the image analysis task for determining the region location of the game role A, image analysis currently may need to be performed on each four frames of the target video to determine whether there is scene switching, and only an image center 1/9 region may need to be analyzed. In this case, if a performance requirement of an image analysis algorithm may meet 360p and 15 fps, the image analysis task is allocated to the terminal device. It is assumed that for the image analysis task for determining the region location of the game role A, image analysis may need to be performed on each four frames of images of the target video to determine whether scene switching exists, and only the image center 1/9 region may need to be analyzed. In this case, if the performance requirement of the image analysis algorithm cannot reach 360p and 15 fps, the image analysis task is allocated to the cloud server.

In conclusion, this application provides the video processing collaboration method. The cloud server may determine a target video processing collaboration configuration according to a video processing capability of the terminal device. For example, the cloud server may allocate at least one image processing task to the cloud server or the terminal device, or collaboratively allocate at least one image processing task to the cloud server and the terminal device. In addition, the target video analysis collaboration configuration may be determined according to the video analysis capability of the terminal device. For example, the cloud server may allocate the at least one image analysis task to the cloud server or the terminal device, or allocate the at least one image analysis task to the cloud server and the terminal device. In addition, for image analysis tasks that need to be processed by the cloud server, these image analysis tasks may be allocated to the cloud server. In addition, a remaining image analysis task may be allocated according to the video analysis capability of the terminal device. In this video analysis collaboration method, not only an idle computing resource of the terminal device can be fully used with limited cloud server computing resources, so that a user can be provided with better cloud game image quality experience, but also the image analysis task that may need to be processed by the cloud server can be ensured to be executed by the cloud server. Because performance of the cloud server is more powerful, an image quality effect is further ensured.

As described above, this application proposes that the image analysis task may be allocated to at least one of the cloud server and the terminal device, or the image processing task may be allocated to at least one of the cloud server and the terminal device, that is, the image processing task and the image analysis task may be segmented. Based on this, the image analysis task and the image processing task may be allocated to one terminal device, or may be allocated to different terminal devices. Therefore, in this application, how the image analysis task is allocated to at least one of the cloud server and the terminal device is mainly described. For how the image processing task is allocated to at least one of the cloud server and the terminal device, references may be made to descriptions of related embodiments of the image analysis task.

In some embodiments, the determining a target video processing collaboration configuration according to the video processing capability information of the terminal device includes: determining, in a case that the terminal device has a full video processing capability for the at least one image processing task, that the target video processing collaboration configuration is the video processing collaboration configuration that allocates the at least one image processing task to the terminal device; determining, in a case that the terminal device has a local video processing capability for the at least one image processing task, that the target video processing collaboration configuration is the video processing collaboration configuration that allocates the at least one image processing task to the terminal device and the cloud server; and determining, in a case that the terminal device does not have a video processing capability, that the target video processing collaboration configuration is the video processing collaboration configuration that allocates the at least one image processing task to the cloud server.

In some embodiments, the determining a target video processing collaboration configuration according to the video processing capability of the terminal device includes: determining, in a case that the terminal device has a full video processing capability for the at least one image processing task, that the target video processing collaboration configuration is the video processing collaboration configuration that allocates the at least one image processing task to the cloud server.

In some embodiments, the method further includes: determining whether the terminal device meets a software and hardware capability condition for executing an image processing task; determining, in a case that the terminal device does not meet the software and hardware capability condition for executing the image processing task, that the video processing capability of the terminal device does not meet a requirement of the image processing task; or determining, in a case that the terminal device meets the software and hardware capability condition for executing the image processing task, whether an image processing algorithm used in a case that the terminal device executes the image processing task meets a performance requirement of the target video; determining, in a case that the image processing algorithm does not meet the performance requirement of the target video, that the video processing capability of the terminal device does not meet the requirement of the image processing task; and determining, in a case that the image processing algorithm meets the performance requirement of the target video, that the video processing capability of the terminal device meets the requirement of the image processing task.

In some embodiments, the determining whether the image processing algorithm used in a case that the terminal device executes a first image processing task meets the performance requirement of the target video corresponding to the at least one image processing task includes: determining, in a case that an image region to be processed by the image processing algorithm is a preset region and an image processing frequency is a preset processing frequency and that performance of the image processing algorithm meets a resolution requirement and a frame rate requirement of the target video, that the image processing algorithm meets the performance requirement of the target video; and determining, in a case that an image region to be processed by the image processing algorithm is a preset region and an image processing frequency is a preset processing frequency and that performance of the image processing algorithm does not meet a resolution requirement or a frame rate requirement of the target video, that the image processing algorithm does not meet the performance requirement of the target video.

In some embodiments, an identifier of a first image processing task and first indication information are transmitted to the terminal device in a case that it is determined that the target video processing collaboration configuration is the video processing collaboration configuration that allocates the at least one image processing task to the terminal device, the first image processing task being an image processing task allocated to the terminal device, and the first indication information being used for indicating the terminal device to process the allocated at least one image processing task.

In some embodiments, the foregoing method further includes: transmitting an identifier of a second image processing task and second indication information to the terminal device in a case that it is determined that the target video processing collaboration configuration is the video processing collaboration configuration that collaboratively allocates the at least one image processing task to the terminal device and the cloud server, the second image processing task being an image processing task that may need to be allocated to the terminal device in the at least one image processing task, and the second indication information being used for indicating the terminal device to process the second image processing task.

In some embodiments, before the determining a target video processing collaboration configuration according to the video processing capability of the terminal device, the foregoing method further includes: obtaining a code attribute of the at least one image processing task; and the determining a target video processing collaboration configuration according to the video processing capability of the terminal device includes: determining the target video processing collaboration configuration according to the code attribute of the at least one image processing task and the video processing capability of the terminal device.

In some embodiments, the determining the target video processing collaboration configuration according to the code attribute of the at least one image processing task and the video processing capability of the terminal device includes: allocating, in a case that it is determined, according to the code attribute of the at least one image processing task, that an image processing task that may need to be allocated to the cloud server exists in the at least one image processing task, the image processing task that may need to be allocated to the cloud server to the cloud server, and determining whether a remaining image processing task exists in the at least one image processing task except the image processing task that may need to be allocated to the cloud server; determining, in a case that a remaining image processing task exists in the at least one image processing task, a target video processing collaboration configuration for the remaining image processing task according to the video processing capability information of the terminal device; and determining the target video processing collaboration configuration according to the video processing capability of the terminal device in a case that it is determined, according to the code attribute of the at least one image processing task, that the image processing task that may need to be allocated to the cloud server does not exist in the at least one image processing task.

In some embodiments, the foregoing method further includes: determining an image processing task in the at least one image processing task and whose code attribute meets a preset condition as an image processing task that may need to be allocated to the cloud server. The preset condition refers to one or more of a coding complexity condition, a coding quality condition, or a coding delay condition.

In some embodiments, the code attribute of the image processing task includes any one or more of the following: coding complexity, coding quality, or a coding delay.

In some embodiments, when the code attribute of the image processing task is the coding complexity, the foregoing method further includes: determining whether coding complexity of the image processing task reaches preset coding complexity, and in a case that the preset coding complexity is reached, determining that the code attribute of the image processing task meets a preset condition corresponding to the coding complexity.

In some embodiments, when the code attribute of the image processing task is the coding quality, the foregoing method further includes: determining whether the coding quality of the image processing task reaches preset coding quality, and in a case that the preset coding quality is reached, determining that the code attribute of the image processing task meets a preset condition corresponding to the coding quality.

In some embodiments, when the code attribute of the image processing task is the coding delay, the foregoing method further includes: determining whether the coding delay of the image processing task reaches a preset coding delay, and in a case that the preset coding delay is reached, determining that the code attribute of the image processing task meets a preset condition corresponding to the coding delay.

In some embodiments, any one of the foregoing preset condition, preset coding complexity, preset coding quality, or preset coding delay of the image processing task may be negotiated by the cloud server and the terminal device, or may be predefined, or may be specified by the cloud server, or may be specified by the terminal device, or may be specified by an application layer of the terminal device. This is not limited in this application.

Figure 9A:
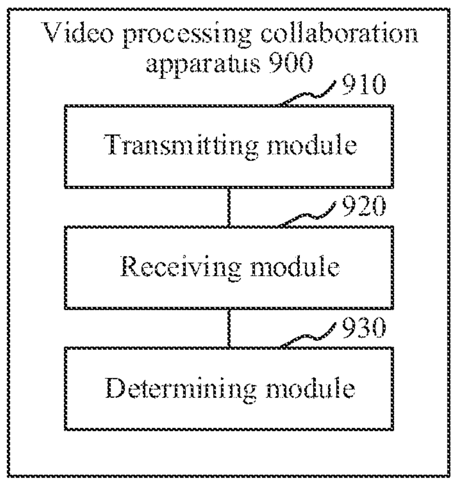
FIG. 9A is a schematic diagram of a video processing collaboration apparatus according to some embodiments.
Figure 9B:
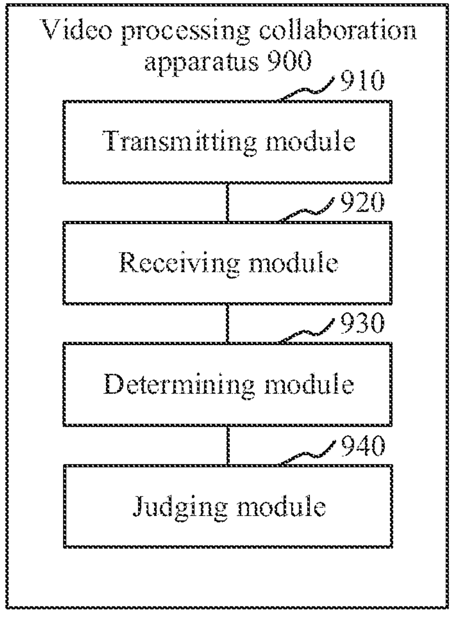
FIG. 9B is a schematic diagram of a video processing collaboration apparatus according to some embodiments.
Figure 9C:
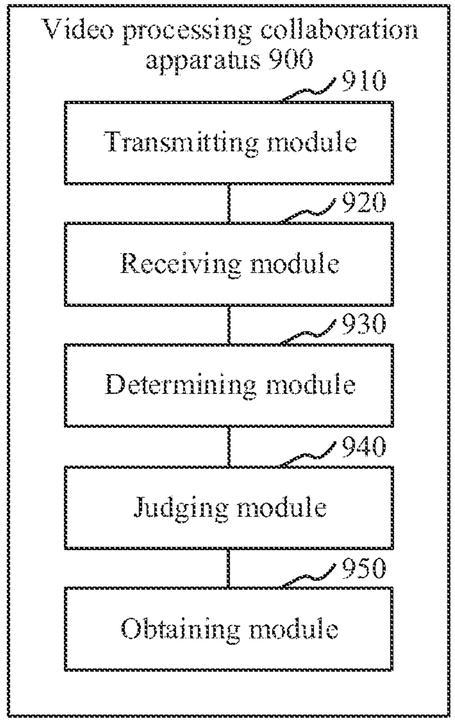
FIG. 9C is a schematic diagram of a video processing collaboration apparatus according to some embodiments.

FIG. 9A to FIG. 9C are schematic diagrams of a video processing collaboration apparatus according to some embodiments. As shown in FIG. 9A, the apparatus 900 includes a transmitting module 910, a receiving module 920, and a determining module 930, where the transmitting module 910 is configured to transmit a video processing capability detection request and a video analysis capability detection request to a terminal device; the receiving module 920 is configured to receive video processing capability information fed back by the terminal device in response to the video processing capability detection request, and receive video analysis capability information fed back by the terminal device in response to the video analysis capability detection request; and the determining module 930 is configured to: determine a target video processing collaboration configuration according to the video processing capability information of the terminal device, and determine a target video analysis collaboration configuration according to the video analysis capability information of the terminal device; the target video processing collaboration configuration being a video processing collaboration configuration that allocates at least one image processing task to the terminal device or the cloud server, or a video processing collaboration configuration that allocates the at least one image processing task to the terminal device and the cloud server; and the target video analysis collaboration configuration being a video analysis collaboration configuration that allocates at least one image analysis task to the terminal device or the cloud server, or a video analysis collaboration configuration that allocates the at least one image analysis task to the terminal device and the cloud server.

In some embodiments, the determining module 930 is further configured to: determine, in a case that the terminal device has a full video analysis capability for the at least one image analysis task, that the target video analysis collaboration configuration is the video analysis collaboration configuration that allocates the at least one image analysis task to the terminal device; determine, in a case that the terminal device has a local video analysis capability for the at least one image analysis task, that the target video analysis collaboration configuration is the video analysis collaboration configuration that allocates the at least one image analysis task to the terminal device and the cloud server; and determine, in a case that the terminal device does not have a video analysis capability, that the target video analysis collaboration configuration is the video analysis collaboration configuration that allocates the at least one image analysis task to the cloud server.

In some embodiments, the determining module 930 is further configured to: determine, in a case that the terminal device has a full video analysis capability for the at least one image analysis task, that the target video analysis collaboration configuration is the video analysis collaboration configuration that allocates the at least one image analysis task to the terminal device; and determine, in a case that the terminal device has a full video analysis capability for the at least one image analysis task, that the target video analysis collaboration configuration is the video analysis collaboration configuration that allocates the at least one image analysis task to the cloud server.

In some embodiments, as shown in FIG. 9B, the apparatus 900 further includes a judging module 940, configured to: determine whether the terminal device meets a software and hardware capability condition for executing an image analysis task; determine, in a case that the terminal device does not meet the software and hardware capability condition for executing the image analysis task, that the video analysis capability of the terminal device does not meet a requirement of the image analysis task; or determine, in a case that the terminal device meets the software and hardware capability condition for executing the image analysis task, whether an image analysis algorithm used in a case that the terminal device executes the image analysis task meets a performance requirement of a target video corresponding to the at least one image analysis task; determine, in a case that the image analysis algorithm does not meet the performance requirement of the target video, that the video analysis capability of the terminal device does not meet the requirement of the image analysis task; and determine, in a case that the image analysis algorithm meets the performance requirement of the target video, that the video analysis capability of the terminal device meets the requirement of the image analysis task.

In some embodiments, the judging module 940 is further configured to: determine, in a case that an image region to be processed by the image analysis algorithm is a preset region and an image analysis frequency is a preset analysis frequency and that performance of the image analysis algorithm meets a resolution requirement and a frame rate requirement of the target video, that the image analysis algorithm meets the performance requirement of the target video; and determine, in a case that an image region to be processed by the image analysis algorithm is a preset region and an image analysis frequency is a preset analysis frequency and that performance of the image analysis algorithm does not meet a resolution requirement or a frame rate requirement of the target video, that the image analysis algorithm does not meet the performance requirement of the target video.

In some embodiments, when the determining module 930 determines that the target video analysis collaboration configuration is the video analysis collaboration configuration that allocates the at least one image analysis task to the terminal device, the transmitting module 910 is further configured to: transmit an identifier of a first image analysis task and first indication information to the terminal device, the first image analysis task being an image analysis task allocated to the terminal device, and the first indication information being used for indicating the terminal device to perform image analysis on the at least one image analysis task.

In some embodiments, when the determining module 930 determines that the target video analysis collaboration configuration is the video analysis collaboration configuration that collaboratively allocates the at least one image analysis task to the terminal device and the cloud server, the transmitting module 910 is further configured to: transmit an identifier of a second image analysis task and second indication information to the terminal device, the second image analysis task being an image analysis task that may need to be allocated to the terminal device in the at least one image analysis task, and the second indication information being used for indicating the terminal device to perform image analysis on the second image analysis task.

In some embodiments, as shown in FIG. 9C, the apparatus 900 further includes an obtaining module 950, configured to obtain a code attribute of the at least one image analysis task. Correspondingly, the determining module 930 is further configured to: determine the target video analysis collaboration configuration according to the code attribute of the at least one image analysis task and the video analysis capability of the terminal device.

In some embodiments, the determining module 930 is further configured to: allocate, in a case that it is determined, according to the code attribute of the at least one image analysis task, that an image analysis task that may need to be allocated to the cloud server exists in the at least one image analysis task, the image analysis task that may need to be allocated to the cloud server to the cloud server, and determine whether a remaining image analysis task exists in the at least one image analysis task except the image analysis task that may need to be allocated to the cloud server; determine, in a case that a remaining image analysis task exists in the at least one image analysis task, a target video analysis collaboration configuration for the remaining image analysis task according to the video analysis capability information of the terminal device; and determine the target video analysis collaboration configuration according to the video analysis capability information of the terminal device in a case that it is determined, according to the code attribute of the at least one image analysis task, that the image analysis task that may need to be allocated to the cloud server does not exist in the at least one image analysis task.

In some embodiments, the determining module 930 is further configured to determine an image analysis task that is in the at least one image analysis task and whose code attribute meets a preset condition as an image analysis task that may need to be allocated to the cloud server.

In some embodiments, the code attribute is any one of the following: coding complexity, coding quality, or a coding delay.

In some embodiments, the code attribute includes the coding complexity; and the determining module 930 is further configured to: determine whether coding complexity of the image analysis task reaches preset coding complexity, and in a case that the preset coding complexity is reached, determine that the code attribute of the image analysis task meets a preset condition corresponding to the coding complexity.

In some embodiments, the code attribute includes the coding quality; and the determining module 930 is further configured to: determine whether the coding quality of the image analysis task reaches preset coding quality, and in a case that the preset coding quality is reached, determine that the code attribute of the image analysis task meets a preset condition corresponding to the coding quality.

In some embodiments, the code attribute includes the coding delay; and the determining module 930 is further configured to: determine whether the coding delay of the image analysis task reaches a preset coding delay, and in a case that the preset coding delay is reached, determine that the code attribute of the image analysis task meets a preset condition corresponding to the coding delay.

In some embodiments, each image analysis task is used for assisting at least one of the following: image coding of the cloud server, image processing of the cloud server, and image processing of the terminal device.

It is to be understood that the apparatus embodiment and the method embodiment may be corresponding to each other. For similar description, references may be made to the method embodiment. Specifically, the apparatuses shown in FIG. 9A to FIG. 9C may execute the foregoing method embodiments, and the foregoing and other operations and/or functions of the modules in the apparatuses are respectively configured to implement corresponding procedures in the foregoing methods.

The foregoing describes the apparatus in the embodiment of this application from a perspective of a functional module with reference to the accompanying drawings. It is to be understood that the function module may be implemented in a hardware form, may be implemented in an instruction in a software form, or may be implemented in a combination of hardware and software modules. Specifically, the steps of the method embodiments in this application may be completed by using an integrated logic circuit of hardware in a processor and/or an instruction in a form of software. The steps of the method disclosed with reference to the embodiments of this application may be directly performed by a hardware decoding processor, or may be performed by using a combination of hardware and software modules in a decoding processor. In some embodiments, the software module may be located in a storage medium that is mature in the art, such as a random access memory, a flash memory, a read-only memory, a programmable read-only memory, an electrically erasable programmable memory, or a register. The storage medium is located in the memory. The processor reads information in the memory and completes the steps of the method embodiments in combination with hardware thereof.

Figure 10:
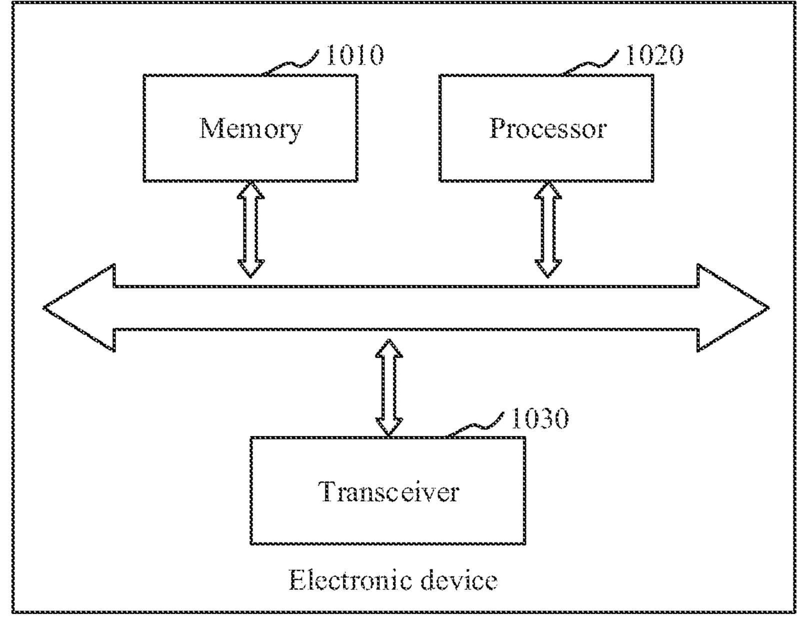
FIG. 10 is a schematic block diagram of an electronic device according to some embodiments.

FIG. 10 is a schematic block diagram of an electronic device according to some embodiments.

As shown in FIG. 10, the electronic device may include:

a memory 1010 and one or more processors 1020, where the memory 1010 is configured to store a computer program, and transmit the computer program to the one or more processors 1020. In other words, the one or more processors 1020 may invoke and run the computer program from the memory 1010, so as to implement the method in the embodiment of this application.

For example, the one or more processors 1020 may be configured to execute the foregoing method embodiments according to instructions in the computer program.

In some embodiments of this application, the processor 1020 may include but is not limited to:

a general purpose processor, a digital signal processor (DSP), an application-specific integrated circuit (ASIC), a field programmable gate array (FPGA) or another programmable logic device, a discrete gate or a transistor logic device, a discrete hardware component, or the like.

In some embodiments of this application, the memory 1010 includes but is not limited to:

a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DRRAM), are available.

In some embodiments of this application, the computer program may be divided into one or more modules, and the one or more modules are stored in the memory 1010 and executed by the processor 1020, so as to complete the method provided in this application. The one or more modules may be a series of computer program instruction segments that can perform specific functions, and the instruction segment is used for describing an execution process of the computer program in the electronic device.

As shown in FIG. 10, the electronic device may further include:

a transceiver 1030, where the transceiver 1030 may be connected to the processor 1020 or the memory 1010.

The processor 1020 may control the transceiver 1030 to communicate with another device. Specifically, the processor 1020 may transmit information or data to the another device, or receive information or data transmitted by the another device. The transceiver 1030 may include a transmitter and a receiver. The transceiver 1030 may further include an antenna, and a quantity of antennas may be one or more.

It is to be understood that components in the electronic device are connected by using a bus system. In addition to a data bus, the bus system further includes a power bus, a control bus, and a status signal bus.

Some embodiments further provide a computer readable storage medium, on which computer readable instructions are stored. When the computer readable instructions are executed, the processor can implement the method in foregoing method embodiments.

Some embodiments further provide a computer program product that includes computer readable instructions, and the computer readable instructions are executed by a processor to implement the method in the foregoing method embodiment.

When software is used for implementation, implementation may be entirely or partially performed in the form of a computer program product. The computer program product includes one or more computer instructions. When the computer program instructions are loaded and executed on a computer, all or some of the processes or functions described in the embodiments of this application are generated. The computer may be a general-purpose computer, a special-purpose computer, a computer network, or another programmable apparatus. The computer instruction may be stored in a computer readable storage medium or transmitted from one computer readable storage medium to another computer readable storage medium. For example, the computer instruction may be transmitted from one website, computer, cloud server or data center to another website, computer, cloud server or data center in a wired (for example, a coaxial cable, an optical fiber or a digital subscriber line (DSL)) or wireless (for example, infrared, wireless or microwave) manner. The computer readable storage medium may be any available medium capable of being accessed by a computer or include one or more data storage devices integrated by an available medium, such as a cloud server and a data center. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may notice that the exemplary modules and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. Those skilled in the art may use different methods to implement the described functions for each particular application, but such implementation is not to be considered beyond the scope of this application.

In the several embodiments provided in this application, it is to be understood that the disclosed system, apparatus, and method may be implemented in other manners. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network units. Some or all of the modules may be selected according to actual may need to achieve the objectives of the solutions of the embodiments. For example, functional modules in the embodiments of this application may be integrated into one processing module, or each of the modules may exist alone physically, or two or more modules are integrated into one module.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video processing collaboration method, performed by a cloud server, the video processing collaboration method comprising:

transmitting a video processing capability request and a video analysis capability request to a terminal device;

receiving video processing capability information and video analysis capability information from the terminal device based on the video processing capability request and the video analysis capability request;

determining a video processing collaboration configuration based on the video processing capability information and a video analysis collaboration configuration based on the video analysis capability information;

allocating at least one image processing task to the terminal device, to the cloud server, or to both the terminal device and the cloud server, based on the video processing collaboration configuration, and allocating at least one image analysis task to the terminal device, to the cloud server, or to both the terminal device and the cloud server, based on the video analysis collaboration configuration, wherein the determining the video analysis collaboration configuration comprises:

determining whether the terminal device meets a software capability condition or a hardware capability condition, based on the video analysis capability information; and determining whether an image analysis algorithm used when the terminal device executes an image analysis task meets a performance requirement of a target video corresponding to the at least one image analysis task.

2. The video processing collaboration method according to claim 1, wherein determining the video processing collaboration configuration includes:

based on the video processing capability information indicating that the terminal device has a full video processing capability for the at least one image processing task, generating the video processing collaboration configuration that allocates the at least one image processing task to the terminal device;

based on the video processing capability information indicating that the terminal device has a local video processing capability for the at least one image processing task, generating the video processing collaboration configuration that allocates the at least one image processing task to both the terminal device and the cloud server; and based on the video processing capability information indicating that the terminal device does not having the video processing capability, generating the video processing collaboration configuration that allocates the at least one image processing task to the cloud server.

3. The video processing collaboration method according to claim 1, wherein determining the video analysis collaboration configuration includes:

based on the video analysis capability information indicating that the terminal device has a full video analysis capability for the at least one image analysis task, generating the video analysis collaboration configuration that allocates the at least one image analysis task to the terminal device; and based on the video analysis capability information indicating that the terminal device has the full video analysis capability for the at least one image analysis task, generating the video analysis collaboration configuration that allocates the at least one image analysis task to the cloud server.

4. The video processing collaboration method according to claim 3, wherein the determination on whether the image analysis algorithm used when the terminal device executes the image analysis task meets the performance requirement of the target video corresponding to the at least one image analysis task is based on the determination on the terminal device meets the software capability condition or the hardware capability condition.

5. The video processing collaboration method according to claim 4, wherein determining whether the image analysis algorithm meets the performance requirement of the target video includes:

determining that the image analysis algorithm meets the performance requirement when a performance of the image analysis algorithm meets a resolution requirement and a frame rate requirement of the target video, and determining that the image analysis algorithm does not meet the performance requirement when the performance of the image analysis algorithm does not meet the resolution requirement or does not meet the frame rate requirement of the target video.

6. The video processing collaboration method according to claim 1, further comprising:

transmitting an identifier of a first image analysis task and first indication information to the terminal device when the video analysis collaboration configuration allocates the at least one image analysis task to the terminal device, wherein the first image analysis task is allocated to the terminal device, and the first indication information indicates to the terminal device to perform image analysis on the allocated at least one image analysis task.

7. The video processing collaboration method according to claim 1, wherein before determining the video analysis collaboration configuration, the video processing collaboration method further comprises obtaining a code attribute of the at least one image analysis task, and wherein the video analysis collaboration configuration is determined based on the code attribute of the at least one image analysis task and the video analysis capability information of the terminal device.

8. The video processing collaboration method according to claim 7, wherein determining the video analysis collaboration configuration based on the code attribute comprises:

based on determining that an image analysis task that is to be allocated to the cloud server exists in the at least one image analysis task, allocating the image analysis task to the cloud server, and determining whether a remaining image analysis task exists in the at least one image analysis task;

determining a video analysis collaboration configuration for the remaining image analysis task when the remaining image analysis task exists, and determining the video analysis collaboration configuration based on the video analysis capability information when the image analysis task that is to be allocated to the cloud server does not exist in the at least one image analysis task.

9. The video processing collaboration method according to claim 8, wherein the video processing collaboration method further comprises:

determining, as the image analysis task that is to be allocated to the cloud server, an image analysis task in the at least one image analysis task whose code attribute meets a preset condition.

10. The video processing collaboration method according to claim 9, wherein the code attribute comprises a coding quality; and when the coding quality of the image analysis task is greater than a preset coding quality threshold, determining that the code attribute of the image analysis task meets the preset condition.

11. A video processing collaboration apparatus, comprising:

at least one memory configured to store computer program code; and at least one processor configured to operate as instructed by the computer program code, the computer program code comprising:

transmitting code configured to cause the at least one processor to transmit a video processing capability request and a video analysis capability request to a terminal device;

receiving code configured to cause the at least one processor to receive video processing capability information and video analysis capability information from the terminal device based on the video processing capability request and the video analysis capability request;

determining code configured to cause the at least one processor to determine a video processing collaboration configuration based on the video processing capability information and a video analysis collaboration configuration based on the video analysis capability information;

first allocating code configured to cause the at least one processor to allocate at least one image processing task to the terminal device, to a cloud server, or to both the terminal device and the cloud server, based on the video processing collaboration configuration, and second allocating code configured to cause the at least one processor to allocate at least one image analysis task to the terminal device, to the cloud server, or to both the terminal device and the cloud server, based on the video analysis collaboration configuration, wherein the determining code is configured to further cause the at least one processor to:

determine whether the terminal device meets a software capability condition or a hardware capability condition, based on the video analysis capability information; and determine whether an image analysis algorithm used when the terminal device executes an image analysis task meets a performance requirement of a target video corresponding to the at least one image analysis task.

12. The video processing collaboration apparatus according to claim 11, wherein the determining code is further configured to cause the at least one processor to:

based on the video processing capability information indicating that the terminal device has a full video processing capability for the at least one image processing task, generate the video processing collaboration configuration that allocates the at least one image processing task to the terminal device;

based on the video processing capability information indicating that the terminal device has a local video processing capability for the at least one image processing task, generate the video processing collaboration configuration that allocates the at least one image processing task to both the terminal device and the cloud server; and based on the video processing capability information indicating that the terminal device does not having the video processing capability, generate the video processing collaboration configuration that allocates the at least one image processing task to the cloud server.

13. The video processing collaboration apparatus according to claim 11, wherein the determining code is further configured to cause the at least one processor to:

based on the video analysis capability information indicating that the terminal device has a full video analysis capability for the at least one image analysis task, generate the video analysis collaboration configuration that allocates the at least one image analysis task to the terminal device; and based on the video analysis capability information indicating that the terminal device has the full video analysis capability for the at least one image analysis task, generate the video analysis collaboration configuration that allocates the at least one image analysis task to the cloud server.

14. The video processing collaboration apparatus according to claim 13, wherein the determination on whether the image analysis algorithm used when the terminal device executes the image analysis task meets the performance requirement of the target video corresponding to the at least one image analysis task is based on the determination on the terminal device meets the software capability condition or the hardware capability condition.

15. The video processing collaboration apparatus according to claim 14, wherein the determining code is configured to further cause the at least one processor to:

determine that the image analysis algorithm meets the performance requirement when a performance of the image analysis algorithm meets a resolution requirement and a frame rate requirement of the target video, and determine that the image analysis algorithm does not meet the performance requirement when the performance of the image analysis algorithm does not meet the resolution requirement or does not meet the frame rate requirement of the target video.

16. The video processing collaboration apparatus according to claim 11, wherein the receiving code is further configured to cause the at least one processor to obtain a code attribute of the at least one image analysis task, and wherein the video analysis collaboration configuration is determined based on the code attribute of the at least one image analysis task and the video analysis capability information of the terminal device.

17. The video processing collaboration apparatus according to claim 16, wherein determining the video analysis collaboration configuration based on the code attribute comprises:

based on determining that an image analysis task that is to be allocated to the cloud server exists in the at least one image analysis task, allocating the image analysis task to the cloud server, and determining whether a remaining image analysis task exists in the at least one image analysis task;

determining a video analysis collaboration configuration for the remaining image analysis task when the remaining image analysis task exists, and determining the video analysis collaboration configuration based on the video analysis capability information when the image analysis task that is to be allocated to the cloud server does not exist in the at least one image analysis task.

18. The video processing collaboration apparatus according to claim 17, wherein the determining code is further configured to cause the at least one processor to:

determine, as the image analysis task that is to be allocated to the cloud server, an image analysis task in the at least one image analysis task whose code attribute meets a preset condition.

19. The video processing collaboration apparatus according to claim 18, wherein the code attribute comprises a coding quality; and when the coding quality of the image analysis task is greater than a preset coding quality threshold, determining that the code attribute of the image analysis task meets the preset condition.

20. A non-transitory computer-readable-medium having stored thereon a computer program for video processing, the computer program configured to cause one or more computer processors to:

transmit a video processing capability request and a video analysis capability request to a terminal device;

receive video processing capability information and video analysis capability information from the terminal device based on the video processing capability request and the video analysis capability request;

determine a video processing collaboration configuration based on the video processing capability information and a video analysis collaboration configuration based on the video analysis capability information;

allocate at least one image processing task to the terminal device, to a cloud server, or to both the terminal device and the cloud server, based on the video processing collaboration configuration, and allocate at least one image analysis task to the terminal device, to the cloud server, or to both the terminal device and the cloud server, based on the video analysis collaboration configuration, wherein the video analysis collaboration configuration is determined based on:
a determination on whether the terminal device meets a software capability condition or a hardware capability condition, based on the video analysis capability information; and
a determination on whether an image analysis algorithm used when the terminal device executes an image analysis task meets a performance requirement of a target video corresponding to the at least one image analysis task.

* * * * *